United States Patent
Kim et al.

(10) Patent No.: US 11,185,984 B2
(45) Date of Patent: Nov. 30, 2021

(54) METHOD AND APPARATUS FOR CONTROLLING ROBOT

(71) Applicant: DOOSAN ROBOTICS INC., Suwon-si (KR)

(72) Inventors: Hyung Jung Kim, Yongin-si (KR); June Hyun Jang, Seoul (KR); Sang Hoon Lee, Seoul (KR)

(73) Assignee: DOOSAN ROBOTICS INC., Suwon-si (KR)

( * ) Notice: Subject to any disclaimer, the term of this patent is extended or adjusted under 35 U.S.C. 154(b) by 562 days.

(21) Appl. No.: 15/762,302

(22) PCT Filed: Oct. 14, 2016

(86) PCT No.: PCT/KR2016/011591
§ 371 (c)(1),
(2) Date: Mar. 22, 2018

(87) PCT Pub. No.: WO2017/052350
PCT Pub. Date: Mar. 30, 2017

(65) Prior Publication Data
US 2018/0264648 A1    Sep. 20, 2018

(30) Foreign Application Priority Data

Sep. 25, 2015 (KR) .................. 10-2015-0136814

(51) Int. Cl.
*G05B 19/18* (2006.01)
*B25J 9/16* (2006.01)
(Continued)

(52) U.S. Cl.
CPC ............. *B25J 9/1666* (2013.01); *B25J 9/163* (2013.01); *B25J 11/00* (2013.01); *B25J 15/00* (2013.01);
(Continued)

(58) Field of Classification Search
CPC ..... B25J 13/02; B25J 9/06; B25J 18/02; B25J 13/06; B25J 9/065; B25J 9/08; B25J 9/10;
(Continued)

(56) References Cited

U.S. PATENT DOCUMENTS 5,511,147 A * 4/1996 Abdel-Malek ......... B25J 9/1671
700/264
7,899,577 B2 * 3/2011 Ban ........................ B25J 9/1692
700/245
(Continued)

FOREIGN PATENT DOCUMENTS

EP    2 749 974 A2    7/2014
EP    2 835 230 A2    2/2015
(Continued)

OTHER PUBLICATIONS

Extended European Search Report dated Mar. 19, 2019 2019 in corresponding EP Application No. 16849075.3, 8 pgs.
(Continued)

*Primary Examiner* — B M M Hannan
(74) *Attorney, Agent, or Firm* — Harness, Dickey & Pierce, P.L.C.

(57) ABSTRACT

A method and an apparatus for controlling a robot are provided. According to one aspect of the present disclosure, the method can include receiving information on a work type of robot motion performed by the robot; generating workflow of the robot motion based upon the received information on the work type of the robot motion; measuring information on work environment in which the robot motion is performed in accordance with the work type and the workflow of the robot motion by controlling the robot; receiving work information on the robot motion in accordance with the work type and the workflow of the robot motion by controlling the robot; and performing the robot
(Continued)

motion in accordance with the work type and the workflow of the robot motion by controlling the robot based upon the measured information on the work environment and the received work information on the robot motion.

20 Claims, 15 Drawing Sheets

(51) Int. Cl.
   *B25J 19/02* (2006.01)
   *B25J 15/00* (2006.01)
   *B25J 11/00* (2006.01)
   *G05B 19/427* (2006.01)

(52) U.S. Cl.
   CPC ............ *B25J 19/02* (2013.01); *G05B 19/427* (2013.01); *G05B 2219/37445* (2013.01); *Y10S 901/09* (2013.01)

(58) Field of Classification Search
   CPC . B25J 9/1005; B25J 9/042; B25J 9/044; B25J 18/04; B25J 18/007; B25J 9/1666; B25J 15/00; B25J 11/00; B25J 9/163; B25J 19/02; B25J 9/1656; B25J 9/1661; B25J 19/022; B25J 19/023; Y10S 901/15; Y10S 901/28; Y10S 901/30; Y10S 901/31; Y10S 901/19; Y10S 901/14; Y10S 901/08; Y10S 901/02; Y10S 901/03; Y10S 901/29; Y10S 901/27; Y10S 901/09; G05B 19/427; G05B 2219/37445
   USPC ......... 700/245, 250, 257, 262, 264
   See application file for complete search history.

(56) References Cited

U.S. PATENT DOCUMENTS

| | | | |
|---|---|---|---|
| 9,069,351 B2 | 6/2015 | Brantmark et al. | |
| 9,701,018 B2* | 7/2017 | Linnell | B25J 9/1664 |
| 2004/0243282 A1* | 12/2004 | Watanabe | B25J 9/1697 |
| | | | 700/259 |
| 2005/0107920 A1* | 5/2005 | Ban | G05B 19/4083 |
| | | | 700/245 |
| 2006/0091842 A1* | 5/2006 | Nishiyama | G05B 19/4183 |
| | | | 318/568.11 |
| 2006/0167587 A1* | 7/2006 | Read | B23Q 9/00 |
| | | | 700/245 |
| 2008/0312769 A1* | 12/2008 | Sato | B25J 9/1687 |
| | | | 700/249 |
| 2009/0289591 A1 | 11/2009 | Kassow et al. | |
| 2011/0270443 A1* | 11/2011 | Kamiya | G05B 19/401 |
| | | | 700/245 |
| 2011/0288667 A1* | 11/2011 | Noda | G05B 19/42 |
| | | | 700/98 |
| 2012/0059517 A1* | 3/2012 | Nomura | B25J 9/1679 |
| | | | 700/259 |
| 2012/0253516 A1* | 10/2012 | Iida | B25J 13/082 |
| | | | 700/258 |
| 2013/0345848 A1* | 12/2013 | IZUMI | B25J 15/0033 |
| | | | 700/114 |
| 2014/0154036 A1* | 6/2014 | Mattern | B25J 9/0084 |
| | | | 414/729 |
| 2014/0188281 A1* | 7/2014 | Nagai | B25J 9/0081 |
| | | | 700/264 |
| 2014/0214203 A1 | 7/2014 | Inoue | |
| 2015/0045955 A1 | 2/2015 | Hashiguchi et al. | |
| 2015/0120055 A1* | 4/2015 | Miyazawa | B25J 9/1697 |
| | | | 700/259 |
| 2015/0165620 A1* | 6/2015 | Osaka | B25J 13/088 |
| | | | 700/250 |
| 2015/0273685 A1* | 10/2015 | Linnell | B25J 9/1664 |
| | | | 700/184 |
| 2016/0031078 A1* | 2/2016 | Kapoor | B25J 13/003 |
| | | | 700/258 |
| 2017/0028550 A1* | 2/2017 | Terada | B25J 9/162 |
| 2017/0028552 A1* | 2/2017 | Lee | B25J 9/1664 |
| 2018/0046152 A1* | 2/2018 | Fujita | G05B 13/0265 |

FOREIGN PATENT DOCUMENTS

| | | |
|---|---|---|
| JP | H05-285800 A | 11/1993 |
| JP | H06134607 A | 5/1994 |
| JP | 2012-198775 A | 10/2012 |
| JP | 2015-000455 A | 1/2015 |
| JP | 5702811 B2 | 4/2015 |
| KR | 2011-0077556 A | 7/2011 |
| KR | 20110114651 A | 10/2011 |

OTHER PUBLICATIONS

International Search Report for PCT/KR2016/011591, ISA/KR, Daejeon, dated Feb. 23, 2017 with English translation thereof.
Written Opinion of the ISA for PCT/KR2016/011591, ISA/KR, Daejeon, dated Feb. 23, 2017.
KIPO Office Action for corresponding Korean Application No. 10-2015-0136814, dated Mar. 27, 2018 (with English translation).

* cited by examiner

METHOD AND APPARATUS FOR CONTROLLING ROBOT

CROSS-REFERENCE TO RELATED APPLICATIONS

This application is a 371 U.S. National Stage of International Application No. PCT/KR2016/011591, filed Oct. 14, 2016. This application claims the benefit of and priority to Korean Patent Application No. 10-2015-0136814, filed Sep. 25, 2015. The disclosures of the above applications are incorporated herein by reference.

TECHNICAL FIELD

Exemplary embodiments of the present disclosure relate to a method and an apparatus for controlling a robot, and more particularly, to a method and an apparatus for controlling a robot based upon the information on the work environment or the robot work in which a robot motion is performed.

BACKGROUND ART

A conventional industrial robot is manufactured to perform only one type of work in a predetermined work environment, and if the robot needs to perform new work or the work environment of the robot changes, there has been a difficulty in developing a new robot control program by inputting information on such new work or the work environment one by one. Particularly, since the conventional robot control program has been developed based upon low-level commands on detailed operation of the robot, only the expert on the driving of the robot could perform it. Accordingly, in order for a robot user to allow the robot to perform the new type of work, there has been the problem in that the expert's help is needed in developing the new control program or modifying the conventional program, and thus it is time-consuming and expensive.

DISCLOSURE

Technical Problem

An object of the present disclosure is to provide a method or an apparatus capable of easily controlling a robot, if work type or work environment of the robot is changed.

Technical Solution

A method for controlling a robot in accordance with the present disclosure for achieving the object can include receiving information on a work type of robot motion performed by the robot; generating workflow of the robot motion based upon the received information on the work type of the robot motion; measuring information on work environment in which the robot motion is performed in accordance with the work type and the workflow of the robot motion by controlling the robot; receiving work information on the robot motion in accordance with the work type and the workflow of the robot motion by controlling the robot; and performing the robot motion in accordance with the work type and the workflow of the robot motion by controlling the robot based upon the measured information on the work environment and the received work information on the robot motion. Herein, the measuring of the information on the work environment can be performed when the robot is initially installed or when the work environment has been changed.

And, the robot can include a robot arm, a controller controlling operation of the robot arm, a teach pendant communicably connected with the controller, and an end effector attached to the end of the robot arm; and further include communicating with a target machine of the robot motion or a peripheral device of the robot motion in connection with the performance of the robot motion.

The work type of the robot motion is related with at least one of machine tool auxiliary work, injection machine auxiliary work, press auxiliary work, pick and place work, screw assembly work, general assembly work, welding work, bonding work, vision inspection work or classification work; and the measuring of the information on the work environment can include measuring the information on the work environment by a contact measurement device of the robot, or measuring the information on the work environment by the contact measurement device of the robot when the robot is operated by a user's direct teaching, or measuring the information on the work environment by a non-contact measurement device of the robot that can include a camera or a laser beam measuring device.

The receiving of the work information on the robot motion can include receiving the work information generated based upon the information of the robot motion when the robot is operated by a user's direct teaching; the performing of the robot motion in accordance with the work type and the workflow of the robot motion by controlling the robot based upon the measured information on the work environment and the received work information on the robot motion can include generating a work program for performing the robot motion, and controlling performance of the robot motion by running the work program; the generating of the work program for performing the robot motion can include generating at least one of first-level commands for the robot motion based upon the measured information on the work environment, the received work information on the robot motion, and the work type and the workflow of the robot motion; and generating a plurality of second-level commands for the robot motion based upon the at least one of first-level commands, and each of the at least one of first-level commands can include a combination of at least two of the plurality of second-level commands; the at least one of first-level commands can be a high-level command including at least one of an approaching command, a retracting command, a picking command, or a placing command; the plurality of second-level commands can be low-level commands including at least two of a control command of the end effector, a control command of the target machine, a control command of the peripheral device, a rapid movement command, a precise movement command, a constant-speed movement command, a repeat command, a condition determination command, and a wait command; and the work type of the robot motion can be related with machine tool auxiliary work, the end effector can include a gripper, the control command of the end effector can include a gripper open command or a gripper close command, the control command of the target machine can include a chuck open command or a chuck close command.

The work type of the robot motion can be related with the machine tool auxiliary work; in this case, the information on the work environment can include at least one of information on the coordinate system of the chuck of the machine tool, information on the position of the door of the machine tool, information on the initial position of the robot for performing the robot motion, or information on the position of a work tray on which a material processed by the machine tool is placed; the work information on the robot motion can include at least one of information related with picking up the material on the work tray, information related with loading the material to the chuck of the machine tool, information related with unloading a workpiece of the material processed by the machine tool from the chuck of the machine tool, information related with placing the workpiece on the work tray, or information related with performing blowing on the workpiece of the material; the measuring of the information on the work environment in which the robot motion is performed or the receiving of the work information on the robot motion can include aligning the direction of the robot with respect to at least one of the work tray, the chuck of the machine tool, or the door of the machine tool; and the measuring of the information on the work environment can include measuring the information on positions of the materials to be processed by the machine tool by measuring a reference point and one to three teaching points for information on the vertical direction to the work tray, the information on the work tray that a size, an interval between positions where the materials are placed, and a distance from the reference point to the position where the material can be placed closest are determined being built in the robot, or measuring the information on the position where the workpiece of the material processed by the machine tool will be unloaded by measuring a reference point and one to three teaching points for information on the vertical direction to the work tray, the information on the work tray that a size, an interval between positions where the materials are placed, and a distance from the reference point to the position where the material can be placed closest are determined being built in the robot, or measuring the information on the work environment based upon the specification information of a gripper, the specification information of the gripper such as a maximum diameter of a catchable material, a finger length, and an attachment angle being built in the robot.

An apparatus for controlling a robot in accordance with the present disclosure for achieving the object can include a workflow generation unit configured to receive information on a work type of robot motion performed by the robot, and to generate workflow of the robot motion based upon the received information on the work type of the robot motion; a work environment measurement unit measuring information on work environment in which the robot motion is performed in accordance with the work type and the workflow of the robot motion by controlling the robot; a work information reception unit receiving work information on the robot motion in accordance with the work type and the workflow of the robot motion by controlling the robot; and a robot motion control unit performing the robot motion in accordance with the work type and the workflow of the robot motion by controlling the robot based upon the measured information on the work environment and the received work information on the robot motion.

Herein, the work environment measurement unit can control the robot for the information on the work environment to be measured by a contact measurement device of the robot, or control the robot for the information on the work environment to be measured by the contact measurement device of the robot when the robot is operated by a user's direct teaching, or include at least one information of information on the work tray that a size, an interval between positions where the materials are placed, and a distance from a reference point to the position where the material can be placed closest are determined, and the specification information of a gripper such as a maximum diameter of a catchable material, a finger length, and an attachment angle, and control the robot based upon the at least one information for the information on the work environment to be measured by the contact measurement device of the robot, or include at least one information of the information on the work tray that a size, an interval between positions where the materials are placed, and a distance from a reference point to the position where the material can be placed closest are determined, and the specification information of a gripper such as a maximum diameter of a catchable material, a finger length, and an attachment angle, and control the robot based upon the at least one information for the information on the work environment to be measured by the contact measurement device of the robot when the robot is operated by a user's direct teaching, or include at least one information of the information on the work tray that a size, an interval between positions where the materials are placed, and a distance from a reference point to the position where the material can be placed closest are determined, and the specification information of a gripper such as a maximum diameter of a catchable material, a finger length, and an attachment angle, and control the robot based upon the at least one information for the information on the work environment to be measured by a camera of the robot or a laser beam measuring device when the robot is operated by a user's direct teaching.

The work information reception unit can receive the work information generated based upon the information of the robot motion when the robot is operated by a user's direct teaching, and further include a work program generation unit generating a work program for performing the robot motion based upon the measured information on the work environment, the received work information on the robot motion, and the work type and the workflow of the robot motion; the robot motion control unit can control performance of the robot motion of the robot based upon the generated work program; the work program generation unit can generate at least one of first-level commands for the robot motion based upon the measured information on the work environment, the received work information on the robot motion, and the work type and the workflow of the robot motion, and generate a plurality of second-level commands for the robot motion based upon the at least one of first-level commands; and each of the at least one of first-level commands can include a combination of at least two of the plurality of second-level commands.

And, the present disclosure can further include a communication interface unit communicating with a target machine or a peripheral device in connection with the performance of the robot motion, and include a computer readable recording medium storing a program for causing the method of controlling the robot of any one of claims 1 to 22 to be performed by an apparatus for controlling the robot.

Advantageous Effects

The present disclosure provides the effect in that the robot user can control the robot by efficiently generating or modifying the robot control program when the work type or the work environment of the robot is changed.

BEST MODE

The present disclosure provides a method and an apparatus for controlling a robot based upon information on work environment or robot work in which robot motion is performed. Hereinafter, the detailed embodiments suitable for implementing the present disclosure will be described with reference to the accompanying drawings. However, it is only exemplary and is not limited thereto as described below.

DETAILED DESCRIPTION

Figure 1:
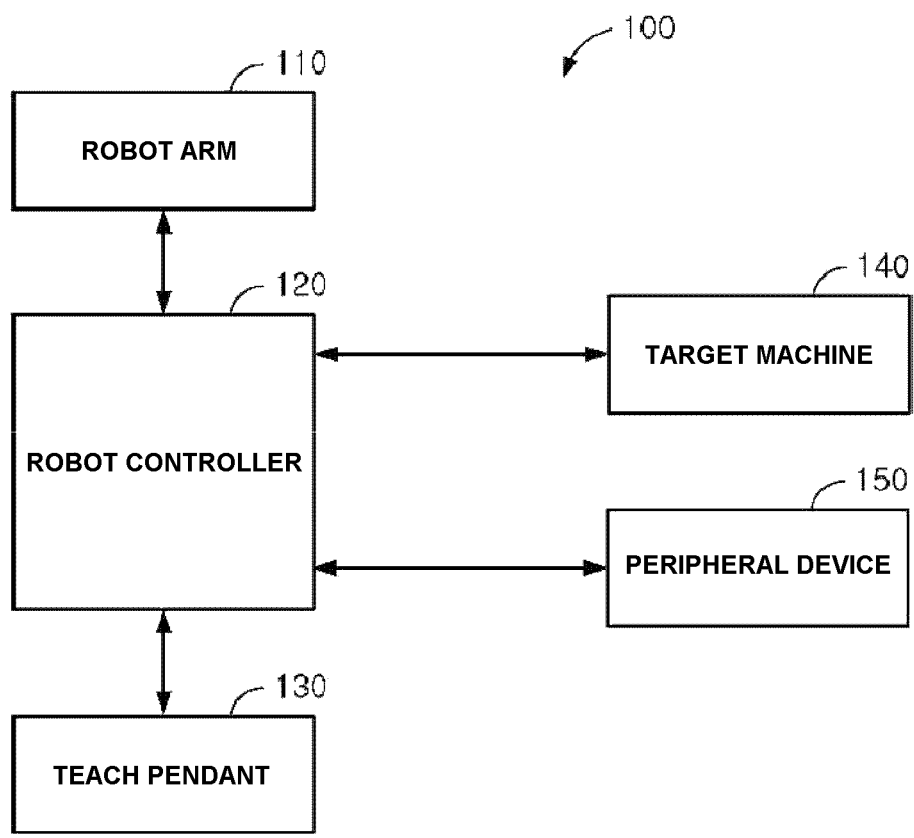
FIG. 1 is a schematic block diagram of a robot system in accordance with one embodiment of the present disclosure.

FIG. 1 is a schematic block diagram of a robot system 100 in accordance with one embodiment of the present disclosure. The robot system 100 can include a robot arm 110, a robot controller 120, a teach pendant 130, a target machine 140, and a peripheral device 150. The robot arm 110 can be a multi-joint robot arm including one or more joint parts that can perform various works, such as machine tool auxiliary work, injection machine auxiliary work, press auxiliary work, pick and place work, screw assembly work, general assembly work, welding work, bonding work, vision inspection work, or classification work, but configurations of the robot arm 110 are not limited thereto. The robot controller 120 can be configured to control operation of the robot arm 110, and communicate with the robot arm 110 via any wired or wireless interface.

In one embodiment, the robot controller 120 can communicate with the target machine 140 or the peripheral device 150 of the robot motion via any wired or wireless interface. The target machine 140 can include one or more of a machine tool, an injection machine, a press and the like, and the peripheral device 150 can include one or more of a work tray (e.g., a palette), a conveyor, and the like. The teach pendant 130, as an input/output device including a user interface for controlling the operation of the robot arm 110, can communicate with the robot controller 120 via any wired or wireless interface. The teach pendant 130, as an input device, can include a keyboard, a touch screen, and the like, and as an output device, a display and the like. In FIG. 1, the robot arm 110 and the robot controller 120 are illustrated as a separate configuration or device, but the robot arm 110 and the robot controller 120 can be also coupled as one device. In this specification, the robot controller 120, the teach pendant 130 or a combination of the robot controller 120 and the teach pendant 130 can be comprehensively referred to as an apparatus for controlling the robot.

Figure 2:
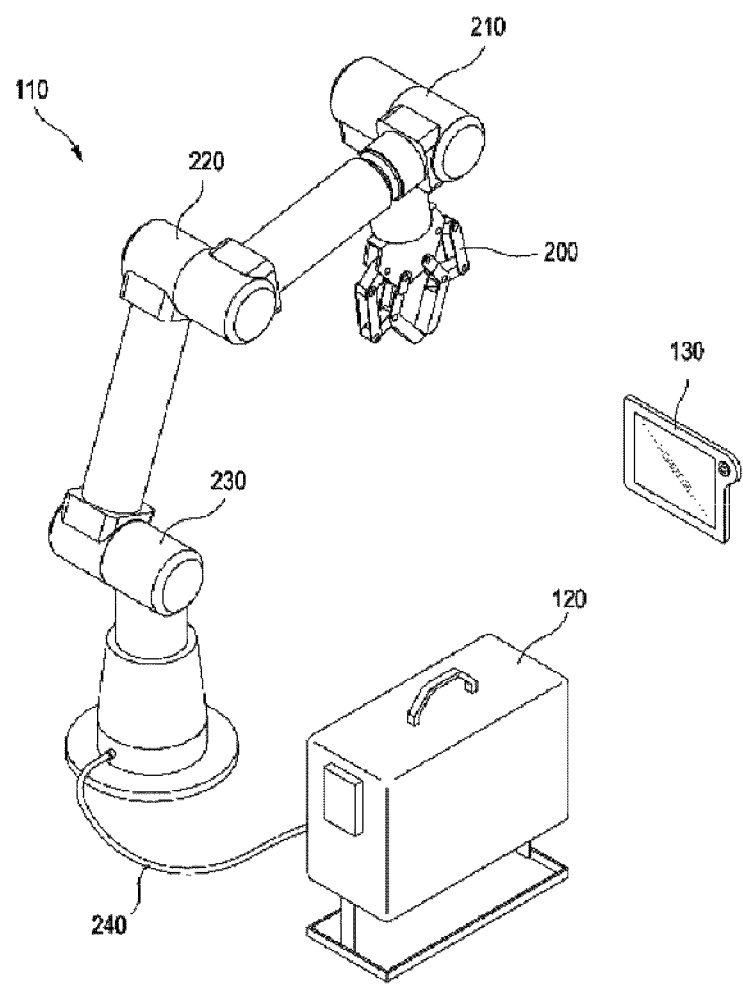
FIG. 2 is a perspective view illustrating a schematic external configuration of a robot arm in accordance with one embodiment of the present disclosure.

FIG. 2 is a perspective view illustrating a schematic configuration of the robot arm 110 in accordance with one embodiment of the present disclosure. As illustrated, the robot arm 110 can include a plurality of joint parts 210, 220, 230, and an end of the robot arm 110 can be attached with an end effector 200. In FIG. 2, the end effector 200 is illustrated as a gripper, but the end effector 200 can include a welding torch, a spray gun, a nut runner and the like as well as the gripper in accordance with the work type in which the robot arm 110 is performed. The robot arm 110 can communicate with the robot controller 120 that can be configured to control the operation of the robot arm 110. In FIG. 2, the robot arm 110 is illustrated to be connected with the robot controller 120 via a cable 240 for wired communication, but the robot arm 110 and the robot controller 120 can be communicably connected via any wired and/or wireless interface. Furthermore, in FIG. 2, the robot arm 110 and the robot controller 120 are illustrated as a separate device, but the robot arm 110 and the robot controller 120 can be coupled as one device. The robot controller 120 can communicate with the teach pendant 130 including a user interface via any wired or wireless interface. For example, if the user inputs a command for controlling the robot arm 110 on the teach pendant 130, the robot controller 120 can control the robot arm 110 in accordance with the control command.

Figure 3:
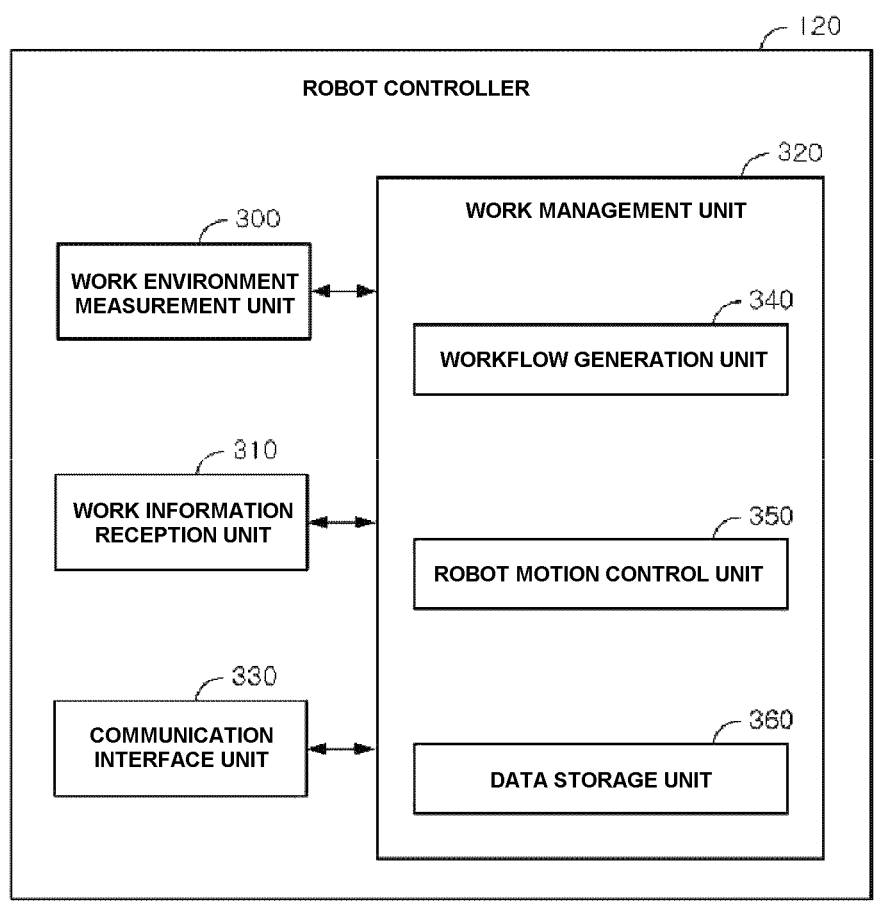
FIG. 3 is a schematic block diagram of a robot controller in accordance with one embodiment of the present disclosure.

FIG. 3 is a schematic block diagram of the robot controller 120 in accordance with one embodiment of the present disclosure. The robot controller 120 can include a work environment measurement unit 300, a work information reception unit 310, and a work management unit 320. Furthermore, the robot controller 120 can include a communication interface unit 330. For example, if the robot controller 120 communicates with a machine tool that is the target machine 140 of the robot motion, the communication interface unit 330 can a) transmit a request to confirm the normal operation of the machine tool to the machine tool, and receive a response thereto from the machine tool; b) transmit a processing start command to the machine tool, and receive a response thereto from the machine tool; c) transmit a chuck open command to the machine tool, and receive a response thereto from the machine tool, and d) transmit a chuck close command to the machine tool, and receive a response thereto from the machine tool.

The work environment measurement unit 300 can be configured to measure information on the work environment in which the robot motion is performed in accordance with the work type and the workflow of the robot motion by controlling the robot arm 110. For example, the information on the work environment in which the robot motion is performed can include information on the position of the target machine 140 (e.g., information on a coordinate system of the chuck of the machine tool or information on the position of the door of the machine tool), information on the position of the work tray on which the material processed by the target machine 140 is placed, information on an initial position or a passage position of the robot (e.g., the robot arm 110 in FIG. 2) for performing the robot motion, and the like. In one embodiment, when measuring the information on the work environment for the initial position of the robot arm 110, the work environment measurement unit 300 can measure the information on the work environment for the initial position of the robot arm 110 by placing the robot arm 110 at the initial position to move, and then storing spatial coordinates of the robot arm 110 at that time. Similarly, when measuring the information on the work environment for the passage position on the path on which the robot arm 110 will be moved, the work environment measurement unit 300 can measure the information on the work environment for the passage position of the robot arm 110 by placing the robot arm 110 at the target passage position, and then storing spatial coordinates of the robot arm 110 at that time.

The work information reception unit 310 can be configured to receive the work information on the robot motion in accordance with the work type and the workflow of the robot motion by controlling the robot arm 110. For example, the work information on the robot motion can include information on picking up the material on the work tray, information on loading the material to the chuck of the machine tool, information on unloading a workpiece of the material processed by the machine tool from the chuck of the machine tool, information on placing the workpiece on the work tray, or information on performing blowing work in order to remove the impurities present in the workpiece of the material, and the like.

In one embodiment, the work information on the robot motion can be information for specifying and displaying the characteristic of the robot motion, such as approaching, retracting, picking, and placing. The work information on the robot motion can be referred to or used to control a mode or a mechanism of the robot motion. As one embodiment, if the work information on the robot motion is the approaching, in order to move to the destination quickly and precisely, the robot (e.g., the robot arm 110 in FIG. 2) can be controlled to move from an initial first point to an intermediate second point in a rapid movement mode that the robot can move the fastest (or a high-speed movement mode), and to move from the second point to a final third point in a precise movement mode that can move precisely.

As another embodiment, if the work information on the robot motion is the retracting, in order to escape the corresponding position safely and quickly, the robot can be controlled to move from the initial first point to the intermediate second point in the precise movement mode to exactly escape without missing the path, and to move from the intermediate second point to the final third point in the rapid movement mode to quickly escape the position. As yet another embodiment, if the work information on the robot motion is the picking, in order to be suitable for picking up a target object at a specific position, the robot can be controlled to approach from the initial first point to the second point where the target object is placed in the approaching mode, to pick up the target object at the corresponding position, and then to escape from the second point to the final third point in the retracting mode.

As yet another embodiment, if the work information on the robot motion is the placing, in order to place a target object at a specific position, the robot can be controlled to approach from the initial first point to the second point where the target object is placed in the approaching mode, to place the picked-up target object at the corresponding position, and then to escape from the second point to the final third point in the retracting mode.

The work management unit 320 can include a workflow generation unit 340, a robot motion control unit 350, and a data storage unit 360. The workflow generation unit 340 can be configured to receive information on the work type of the robot motion performed by the robot arm 110, and to generate the workflow of the robot motion based upon the received information on the work type of the robot motion. For example, if the work type is the machine tool auxiliary work, the workflow of the robot motion can be composed of a) placing at an initial position, b) opening the door of the machine tool room, c) picking up the material from a work tray (e.g., a palette), d) entering the machine tool room through the door of the machine tool room, e) placing the picked-up material at a specific position of the machine tool within the machine tool room, and f) waiting for the material to be processed by the machine tool to retract the material. Meanwhile, it is exemplary and in addition, the workflow generation unit 340 can generate different workflows that are composed of the operations suitable for the corresponding work, such as injection machine auxiliary work, press auxiliary work, screw assembly work, general assembly work, welding work, bonding work, vision inspection work, and classification work in accordance with the received work type.

The robot motion control unit 350 can be configured to control the robot arm 110 based upon the measured information on the work environment and the received work information on the robot motion for the robot arm 110 to perform the robot motion in accordance with the work type and the workflow of the robot motion. In one embodiment, the robot motion control unit 350 can control the robot arm 110 by selecting a suitable work program among the work programs stored in the data storage unit 360 in accordance with the work type and the workflow of the robot motion based upon the measured information on the work environment, the received work information on the robot motion, and the like, and running the selected work program.

In another embodiment, the robot motion control unit 350 can include a work program generation unit (not shown) generating the work programs for performing the robot motion based upon the measured information on the work environment, the received work information on the robot motion, the work type and the workflow of the robot motion, and the like. In this case, the robot motion control unit 350 can control the operation of the robot arm 110 by running the work program generated in the work program generation unit.

The work program generation unit can be configured to generate at least one of first-level commands for the robot motion based upon the measured information on the work environment, the received work information on the robot motion, the work type and the workflow of the robot motion, and the like. In one embodiment, the at least one of first-level commands can be a high-level command including at least one of an approaching command, a retracting command, a picking command, or a placing command. For example, the approaching command can be a high-level command for the robot (e.g., the robot arm 110 in FIG. 2) to effectively approach a specific position, the retracting command can be a high-level command for the robot to effectively escape the specific position, the picking command can be a high-level command for the robot to hold a target object at the specific position, and the placing command can be a high-level command for the robot to place the target object at the specific position.

In one embodiment, each of the approaching command, the retracting command, the picking command, and the placing command can correspond to the work information on the approaching, the retracting, the picking, and the placing of the robot. For example, if the received work information on the robot motion is related with the approaching, the work program generation unit can generate the approaching command corresponding to the work information. Similarly, if the received work information on the robot motion is related with the retracting, the picking, or the placing, the work program generation unit can generate the retracting command, the picking command, or the placing command corresponding to the work information.

The work program generation unit can be configured to generate a plurality of second-level commands for the robot motion based upon the at least one of first-level commands. The plurality of second-level commands can be low-level commands including at least two of a control command of the end effector, a control command of the target machine (e.g., the machine tool), a control command of the peripheral device (e.g., the work tray or the conveyor), a rapid movement command (or a high-speed movement command), a precise movement command, a constant-speed movement command, a repeat command, a condition determination command, and a wait command. For example, if the work type of the robot motion is the machine tool auxiliary work, the control command of the end effector can include a gripper open command or a gripper close command that is a gripper control command, and the control command of the target machine (e.g., the machine tool) can include a chuck open command or a chuck close command.

In one embodiment, the first-level command can include a combination of at least two of second-level commands. For example, the approaching command that is the first-level command can be composed of a combination of the rapid movement command and the precise movement command that are the second-level commands. Similarly, the retracting command that is the first-level command can be also composed of a combination of the rapid movement command and the precise movement command that are the second-level commands. Furthermore, the picking command that is the first-level command can be composed of a combination of the rapid movement command, the precise movement command, or the gripper control command that are the second-level commands. Similarly, the placing command that is the first-level command can be also composed of a combination of the rapid movement command, the precise movement command, or the gripper control command that are the second-level commands.

The work program generation unit can be configured to generate a work program for the robot motion based upon a plurality of the second-level commands. In one embodiment, the work program generation unit can be configured to generate a plurality of third-level commands that are lower-level commands based upon the plurality of second-level commands. In this case, the work program generation unit can be configured to generate the work program for the robot motion based upon the plurality of third-level commands.

The data storage unit 360 can store the work type of the robot motion, the workflow of the robot motion for each work type, the information on the work environment in which the robot motion is performed, the work information on the robot motion, and the like. Furthermore, the data storage unit 360 can store the work program and the like that can be run in the robot motion control unit 350 in accordance with each work type.

Figure 4:
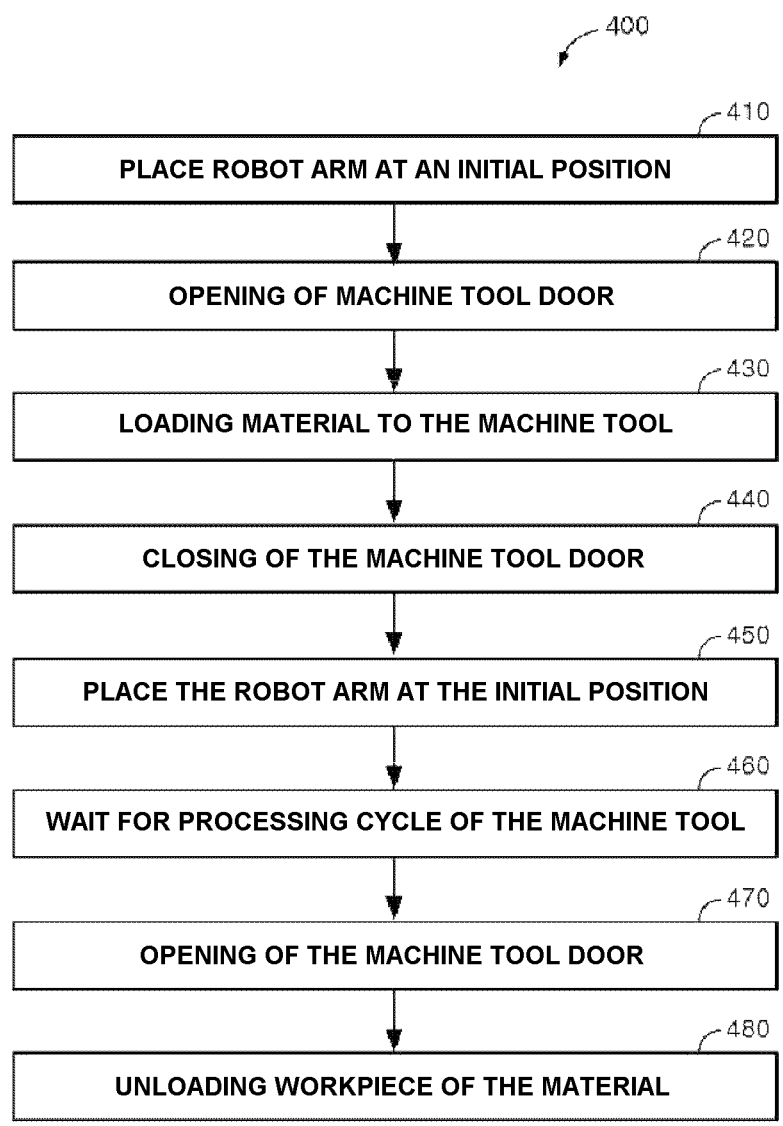
FIG. 4 is a view illustrating workflow of robot motion generated based upon information on a work type of the robot motion in accordance with one embodiment of the present disclosure.

FIG. 4 is a view illustrating workflow of the robot motion generated based upon the information on the work type of the robot motion in accordance with one embodiment of the present disclosure. An apparatus for controlling the robot (e.g., the workflow generation unit 340 in FIG. 3) can generate the workflow of the robot motion based upon the received information on the work type of the robot motion. For example, if the work type is the machine tool auxiliary work using a single gripper, the workflow as illustrated in FIG. 4 can be generated. Referring to FIG. 4, the workflow of the machine tool auxiliary work using the single gripper can include placing the robot arm 110 at an initial position (Step 410), opening the door of the machine tool (Step 420), loading a material on the work tray to the machine tool (Step 430), closing the door of the machine tool (Step 440), placing the robot arm 110 at the initial position (Step 450), waiting for the processing cycle of the machine tool (Step 460), opening the door of the machine tool (Step 470), unloading a workpiece of the material (Step 480), and the like. After unloading the workpiece of the material, next material can be loaded to the machine tool. That is, the loading of the material on the work tray to the machine tool (Step 430) to the unloading of the workpiece of the material (Step 480) can be repetitively performed as many times as the number of the materials provided on the work tray. Likewise, even if the work type is the machine tool auxiliary work using a dual gripper, a corresponding workflow can be generated, and workflows for other work types can be also generated.

In generating the workflow described above, it is necessary to teach the work environment of the robot related with the machine tool 510 for performing each operation. As one example, it is necessary that the placing of the robot arm 110 at the initial position (Step 410) teaches coordinates of the initial position, and the opening of the door of the machine tool 510 (Step 420) teaches the position of a door handle. Furthermore, for the loading of the material on the work tray to the machine tool (Step 430) and the unloading of the workpiece of the material (Step 480), it is necessary to teach the position of the material to be picked up, the position of the chuck loading the material, the position of the tray unloading the workpiece of the material, and the like. The teaching on the work environment of the robot can be made by direct teaching that gives the position of the robot by moving it directly and indirect teaching that inputs the coordinates thereof.

Figure 5:
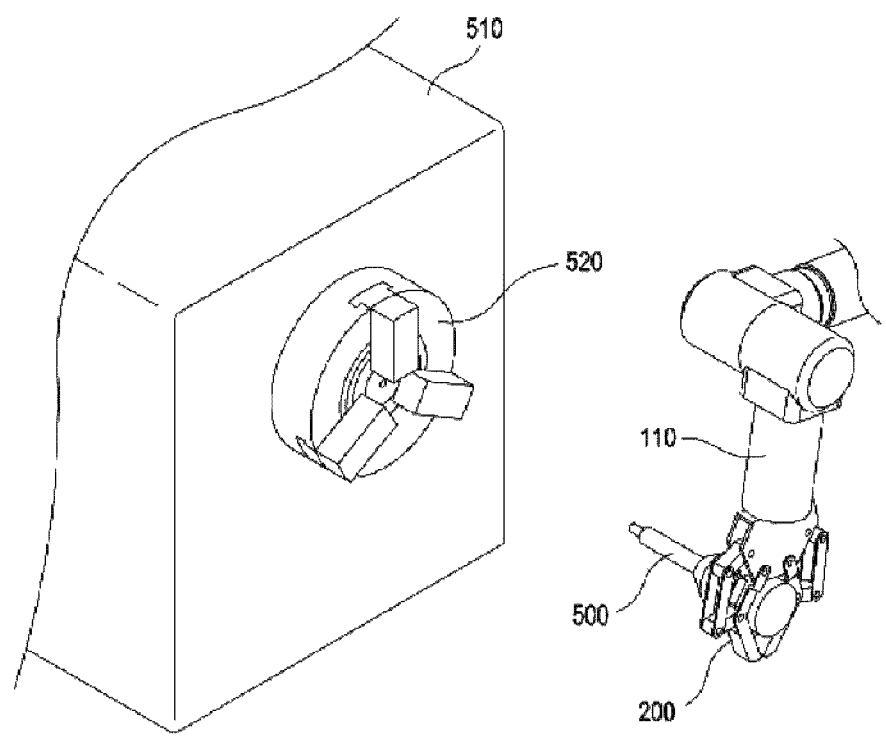
FIG. 5 is a perspective view illustrating a method of measuring and teaching work environment of the robot related with a chuck 520 of a machine tool 510 in accordance with one embodiment of the present disclosure.

FIG. 5 is a perspective view illustrating a method of measuring and teaching the work environment of the robot related with a chuck 520 of a machine tool 510 in accordance with one embodiment of the present disclosure. Referring to FIG. 5, the end effector 200 of the robot arm 110 can hold a contact measurement device 500 in order to teach and measure information on the coordinates of the chuck 520 of the machine tool 510 that is one of the work environments of the robot.

As one embodiment, the apparatus for controlling the robot (e.g., the work environment measurement unit 300 in FIG. 3) can measure information on the coordinate system of the chuck 520 of the machine tool 510 by controlling the robot arm 110 to contact one or more points related with the chuck 520 of the machine tool 510 by the contact measurement device 500. In this case, the apparatus for controlling the robot can measure the information on the coordinates of the chuck 520 of the machine tool 510 by storing spatial coordinates of the point where the contact measurement device 500 is placed at a specific timing.

As another embodiment, while the robot arm 110 is being manipulated for the contact measurement device 500 to contact one or more points related with the chuck 520 of the machine tool 510 through the direct teaching that teaches based upon an operator's direct robot movement, the apparatus for controlling the robot can measure the information on the coordinates of the chuck 520 of the machine tool 510.

As yet another embodiment, the apparatus for controlling the robot can measure the information on the coordinates of the chuck 520 of the machine tool 510 using a non-contact measurement device, such as a camera or a laser beam measuring device, instead of the contact measurement device 500.

FIG. 5 illustrates a method of measuring the work environment of the robot related with the machine tool 510, but the apparatus for controlling the robot can also measure the work environment of the robot related with other target machines of the robot motion, such as an injection machine and a press, in a similar method.

Figure 6:
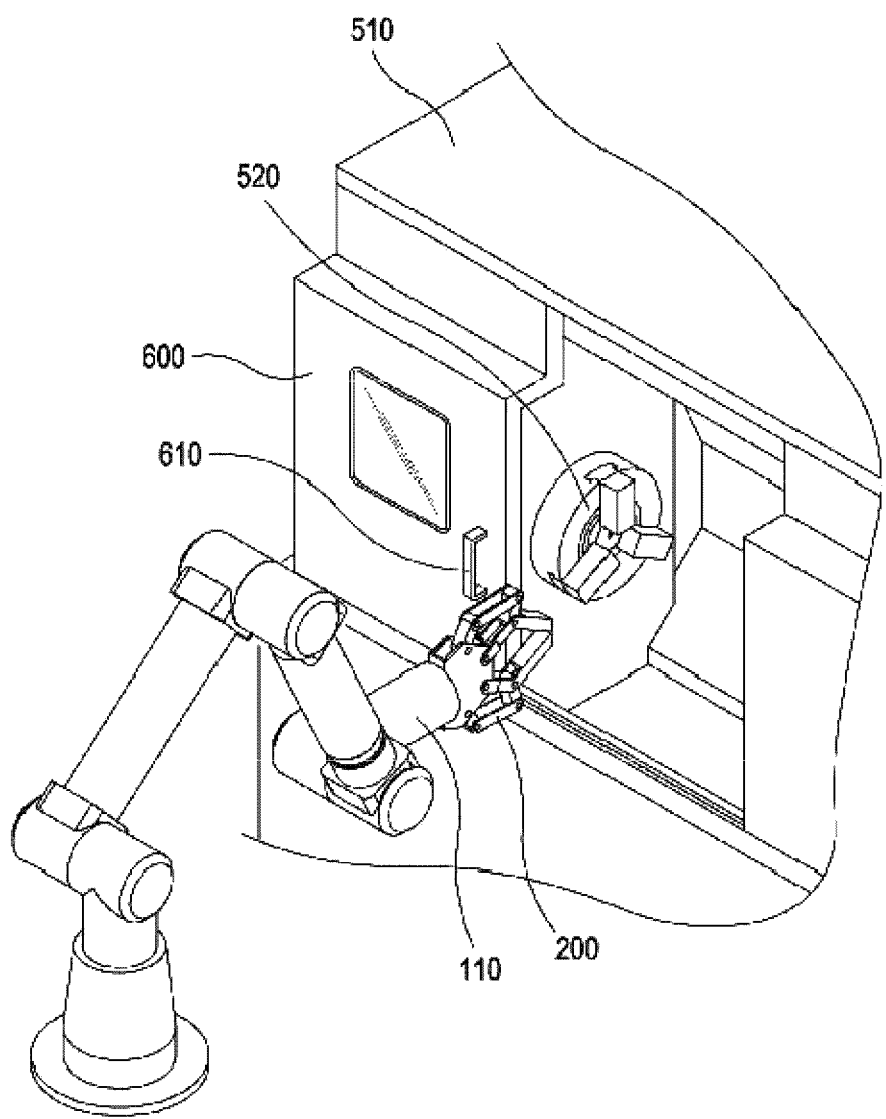
FIG. 6 is a perspective view illustrating a method of measuring and teaching work environment of the robot related with the door of the machine tool 510 in accordance with another embodiment of the present disclosure.

FIG. 6 is a perspective view illustrating a method of measuring and teaching the work environment of the robot related with the door of the machine tool 510 in accordance with another embodiment of the present disclosure. Referring to FIG. 6, the end effector 200 of the robot arm 110 can be placed adjacent to a handle 610 of a door 600 in order to measure information on the position of the door 600 of the machine tool 510 that is one of the work environments of the robot. In this case, in order for the end effector 200 of the robot arm 110 to push the handle 610 of the door 600 to open and close the door 600, the direction of the end effector 200 of the robot arm 110 can be automatically aligned with the direction of the handle 610 of the door 600.

As one embodiment, the apparatus for controlling the robot (e.g., the work environment measurement unit 300 in FIG. 3) can measure information on the position of the door 600 of the machine tool 510 by controlling the robot arm 110 for the end effector 200 of the robot arm 110 to push the handle 610 of the door 600 to open and close the door 600. In this case, the apparatus for controlling the robot can measure the information on the position on the door 600 of the machine tool 510 by storing spatial coordinates on which the robot arm 110 is placed at a specific timing, such as the start of the opening that the robot arm 110 opens the door 600, the end of the opening that the robot arm 110 opens the door 600, the start of the closing that the robot arm 110 closes the door 600, and the end of the closing that the robot arm 110 closes the door 600.

As another embodiment, while the end effector 200 of the robot arm 110 is being manipulated to push the handle 610 of the door 600 to open and close the door 600 through an operator's direct teaching, the apparatus for controlling the robot can measure the information on the position of the door 600 of the machine tool 510. FIG. 6 illustrates the method of measuring the work environment of the robot related with the door 600 of the machine tool 510, but the apparatus for controlling the robot can also measure the work environment of the robot related with the door or other opening/closing devices of other target machines of the robot motion, such as an injection machine and a press, in a similar method.

Figure 7:
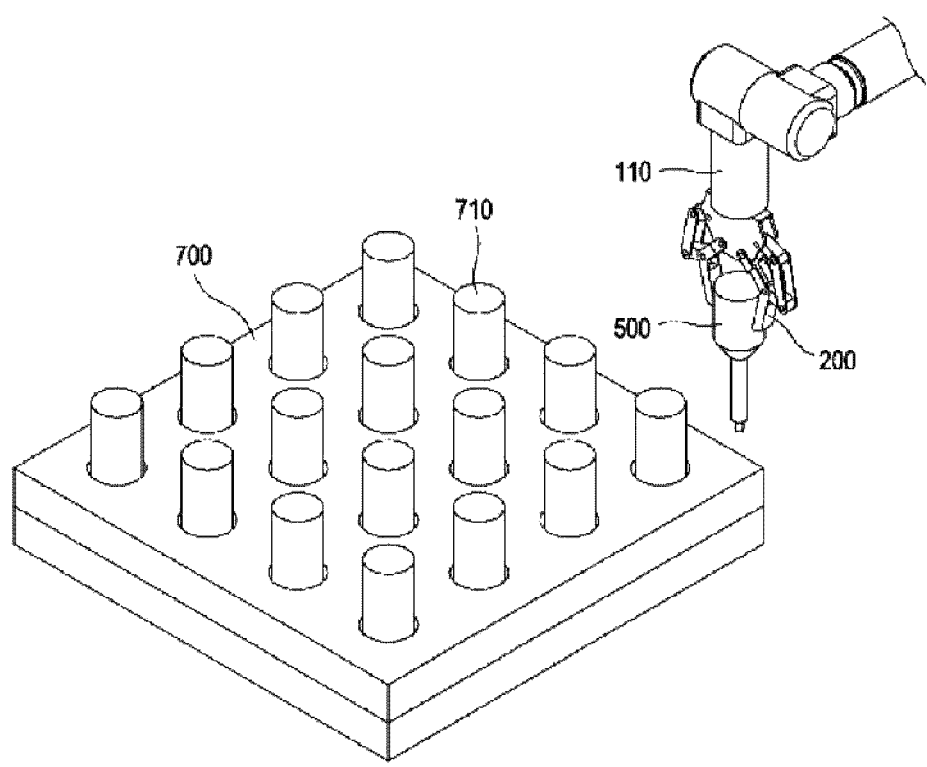
FIG. 7 is a perspective view illustrating a method of measuring and teaching the work environment of the robot related with a work tray 700 in accordance with one embodiment of the present disclosure.

FIG. 7 is a perspective view illustrating a method of measuring and teaching the work environment of the robot related with a work tray 700 in accordance with one embodiment of the present disclosure. Referring to FIG. 7, the end effector 200 of the robot arm 110 can hold the contact measurement device 500 in order to measure information on the position of the work tray 700 on which a material 710 is placed that is one of the work environments of the robot.

As one embodiment, the apparatus for controlling the robot (e.g., the work environment measurement unit 300 in FIG. 3) can measure the information on the position of the work tray 700 by controlling the robot arm 110 to contact one or more points of the work tray 700 (e.g., an edge of the work tray 700) by the contact measurement device 500. In this case, the apparatus for controlling the robot can measure the information on the position of the work tray 700 by storing spatial coordinates of the point on which the contact measurement device 500 is placed at a specific timing.

As another embodiment, while the robot arm 110 is being manipulated for the contact measurement device 500 to contact one or more points of the work tray 700 through an operator's direct teaching, the apparatus for controlling the robot can measure the information on the position of the work tray 700. In yet another embodiment, the apparatus for controlling the robot can measure the information on the position of the work tray 700 using a non-contact measurement device, such as a camera or a laser beam measuring device, instead of the contract measurement device 500. FIG. 7 illustrates the method of measuring the work environment of the robot related with the work tray 700, but the apparatus for controlling the robot can also measure the work environment of the robot related with other peripheral devices of the robot motion, such as a conveyor, in a similar method.

Figure 8:
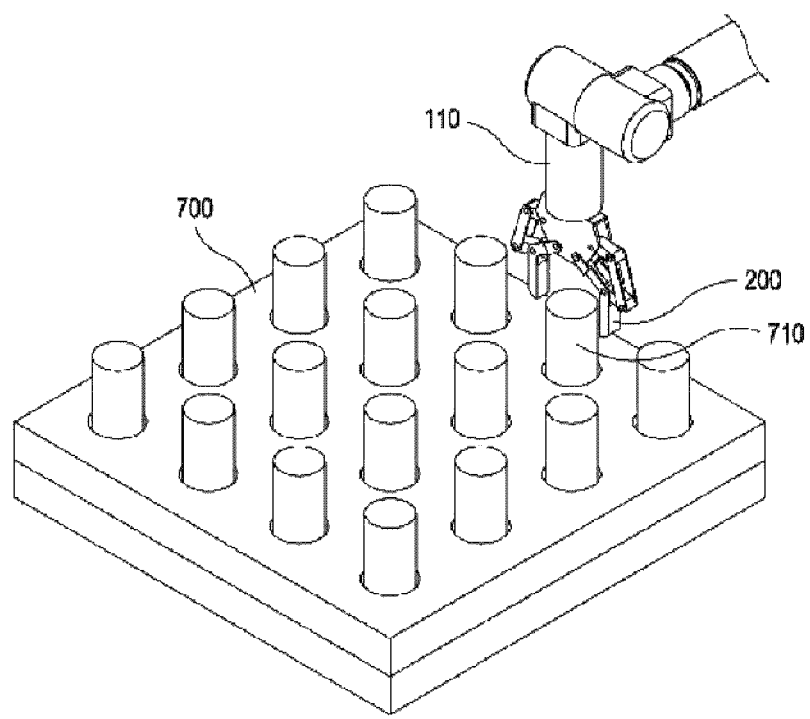
FIG. 8 is a perspective view illustrating a method of receiving work information on the robot motion related with the work tray in accordance with one embodiment of the present disclosure.

FIG. 8 is a perspective view illustrating a method of receiving the work information on the robot motion related with the work tray 700 in accordance with one embodiment of the present disclosure. Referring to FIG. 8, the end effector 200 of the robot arm 110 can place adjacent to the material 710 on the work tray 700 in order to receive the work information on the robot motion (e.g., the information related with the picking up the material 710 on the work tray 700). In this case, in order for the end effector 200 of the robot arm 110 to pick up the material 710 on the work tray 700, the direction of the end effector 200 of the robot arm 110 can be automatically aligned with the direction of the work tray 700.

The apparatus for controlling the robot (e.g., the work information reception unit 310 in FIG. 3) can receive the work information related with the picking up of the material 710 on the work tray 700 by controlling for the end effector 200 of the robot arm 110 to pick up the material 710 on the work tray 700. The apparatus for controlling the robot can receive the work information related with the picking up of the material 710 on the work tray 700 by storing spatial coordinates of the point on which the robot arm 110 is placed at the specific timings in the picking-up. In one embodiment, while the end effector 200 of the robot arm 110 is being manipulated to pick up the material 710 through an operator's direct teaching, the apparatus for controlling the robot can receive the work information related with the picking up of the material 710 on the work tray 700. FIG. 8 illustrates the method of receiving the work information on the robot motion related with the work tray 700, but the apparatus for controlling the robot can also receive the work information of the robot related with other peripheral devices of the robot motion, such as a conveyor, in a similar method.

In one embodiment, the work information related with the picking up of the material 710 on the work tray 700 can correspond to the picking that is the work information for picking up a target object at a specific position. In this case, based upon the work information related with the picking up of the material 710 on the work tray 700, the robot arm 110 can be controlled to approach from the initial first point (e.g., the initial position of the robot arm 110) to the second point where the material 710 on the work tray 700 is placed in the approaching mode, to pick up the material 710 at the corresponding position, and then to escape from the second point to the final third point in the retracting mode.

Figure 9:
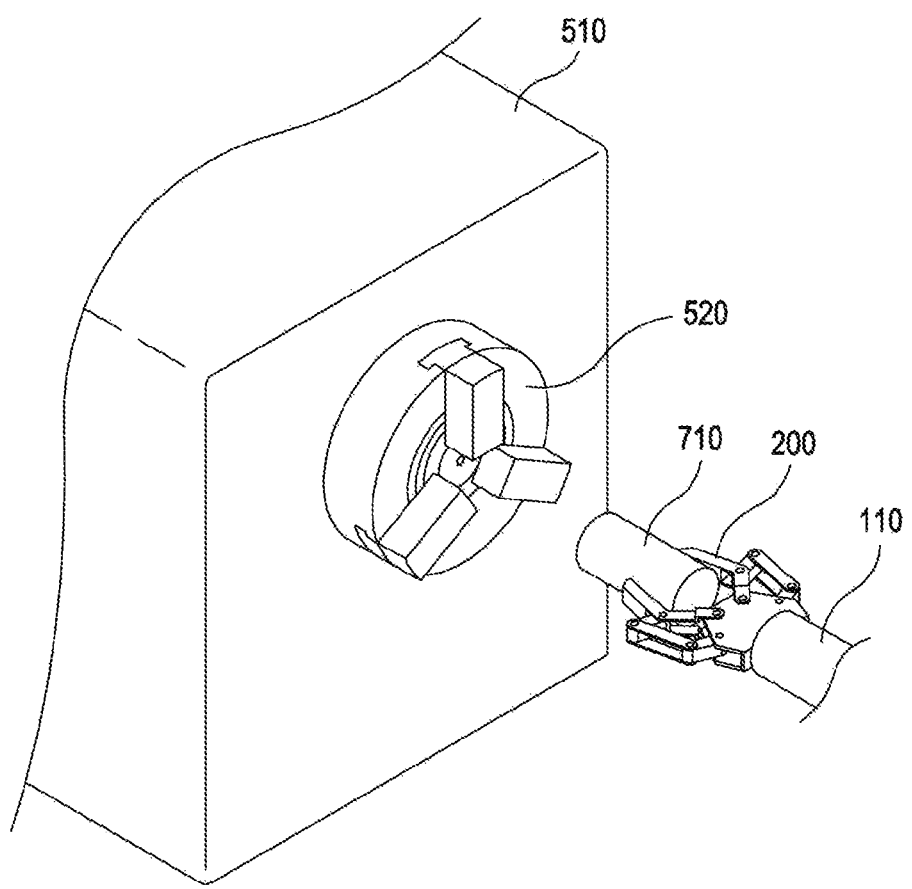
FIG. 9 is a perspective view illustrating a method of receiving work information on the robot motion related with the machine tool in accordance with one embodiment of the present disclosure.

FIG. 9 is a perspective view illustrating a method of receiving the work information on the robot motion related with the machine tool 510 in accordance with one embodiment of the present disclosure. Referring to FIG. 9, the end effector 200 of the robot arm 110 holding the material 710 can be placed adjacent to the chuck 520 of the machine tool 510 in order to receive the work information on the robot motion (e.g., the information related with the loading of the material 710 to the chuck 520 of the machine tool 510). In this case, in order for the end effector 200 of the robot arm 110 to load the material 710 to the chuck 520 of the machine tool 510, the direction of the end effector 200 of the robot arm 110 can be automatically aligned with the direction of the chuck 520 of the machine tool 510.

The apparatus for controlling the robot (e.g., the work information reception unit 310 in FIG. 3) can receive the work information related with the loading of the material 710 to the chuck 520 of the machine tool 510 by controlling for the end effector 200 of the robot arm 110 to load the material 710 to the chuck 520 of the machine tool 510. The apparatus for controlling the robot can receive the work information related with the loading of the material 710 to the chuck 520 of the machine tool 510 by storing spatial coordinates of the point where the robot arm 110 is placed at the specific timings of the loading.

In one embodiment, while the end effector 200 of the robot arm 110 is being manipulated to load the material 710 to the chuck 520 of the machine tool 510 through an operator's direct teaching, the apparatus for controlling the robot can receive the work information related with the loading of the material 710 to the chuck 520 of the machine tool 510. FIG. 9 illustrates the method of receiving the work information on the robot motion related with the chuck 520 of the machine tool 510, but the apparatus for controlling the robot can also receive the work information of the robot related with other target machines of the robot motion, such as an injection machine and a press, in a similar method.

In one embodiment, the work information related with the loading of the material 710 to the chuck 520 of the machine tool 510 can correspond to the placing that is the work information for placing a target object at a specific position. In this case, based upon the work information related with the loading of the material 710 to the chuck 520 of the machine tool 510, the robot arm 110 can be controlled to approach from the initial first point (e.g., the initial position of the robot arm 110) to the second point where the chuck 520 of the machine tool 510 is placed in the approaching mode, to place the picked-up material 710 at the corresponding position, and then to escape from the second point to the final third point in the retracting mode.

Similar to the receiving of the work information related with the loading of the material 710 to the chuck 520 of the machine tool 510, the apparatus for controlling the robot can also receive the work information related with the unloading of the workpiece from the chuck 520 of the machine tool 510 after the material 710 has been processed by the machine tool 510. In one embodiment, the work information related with the unloading of the workpiece from the chuck 520 of the machine tool 510 can correspond to the picking that is the work information for picking up a target object at a specific position. In this case, based upon the work information related with the unloading of the workpiece from the chuck 520 of the machine tool 510, the robot arm 110 can be controlled to approach from the initial first point to the second point where the chuck 520 of the machine tool 510 is placed in the approaching mode, to pick up the workpiece at the corresponding position, and then to escape from the second point to the final third point in the retracting mode.

Figure 10:
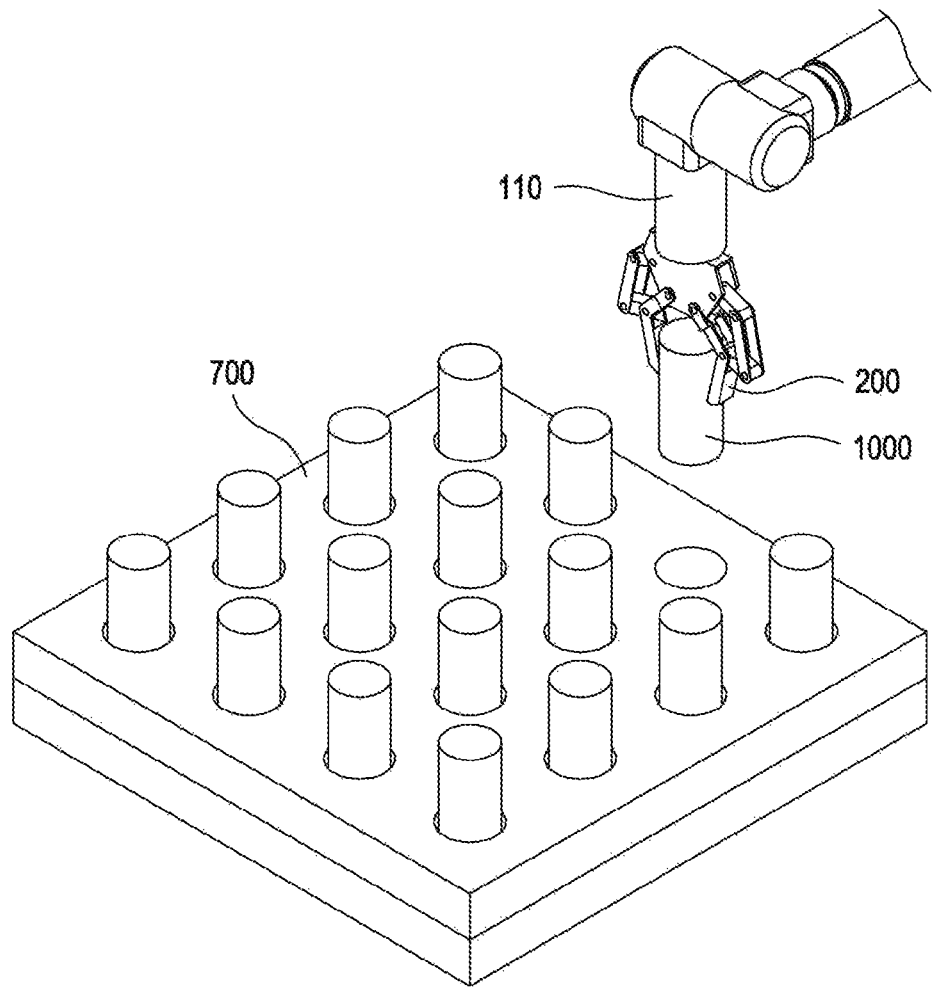
FIG. 10 is a perspective view illustrating a method of receiving the work information on the robot motion related with the work tray in accordance with another embodiment of the present disclosure.

FIG. 10 is a perspective view illustrating a method of receiving the work information on the robot motion related with the work tray 700 in accordance with another embodiment of the present disclosure. Referring to FIG. 10, the end effector 200 of the robot arm 110 holding the workpiece 1000 can be placed adjacent to the work tray 700 in order to receive the work information on the robot motion (e.g., the work information related with the placing of the workpiece 1000 processed by the machine tool 510 on the work tray 700). In this case, in order for the end effector 200 of the robot arm 110 to place the workpiece 1000 on the work tray 700, the direction of the end effector 200 of the robot arm 110 can be automatically aligned with the direction of the work tray 700.

The apparatus for controlling the robot (e.g., the work information reception unit 310 in FIG. 3) can receive the work information related with the placing of the workpiece 1000 on the work tray 700 by controlling for the end effector 200 of the robot arm 110 to place the workpiece 1000 on the work tray 700. The apparatus for controlling the robot can receive the work information related with the placing of the workpiece 1000 on the work tray 700 by storing spatial coordinates at the point where the robot arm 110 is placed at the specific timings of the above operation. In one embodiment, while the end effector 200 of the robot arm 110 is being manipulated to place the workpiece 1000 on the work tray 700 through an operator's direct teaching, the apparatus for controlling the robot can receive the work information related with the placing of the workpiece 1000 on the work tray 700. FIG. 10 illustrates the method of receiving the work information on the robot motion related with the work tray 700, but the apparatus for controlling the robot can also receive the work information of the robot related with other peripheral devices of the robot motion, such as a conveyor, in a similar method.

In one embodiment, the work information related with the placing of the workpiece 1000 on the work tray 700 can correspond to the placing that is the work information for placing a target object at a specific position. In this case, based upon the work information related with the placing of the workpiece 1000 on the work tray 700, the robot arm 110 can be controlled to approach from the initial first point to the second point of the work tray 700 where the workpiece 1000 is placed in the approaching mode, to place the picked-up workpiece 1000 at the corresponding position, and then to escape from the second point to the final third point in the retracting mode.

In one embodiment, before placing the workpiece 1000 on the work tray 700, the blowing work can be performed to remove the impurities and the like on the surface of the workpiece 1000. In this case, the apparatus for controlling the robot can also receive the work information related with the position where the blowing is performed by placing the robot arm 110 at the position where the blowing work will be performed, and then storing spatial coordinates at the point where the robot arm 110 is placed.

Based upon the above descriptions with reference to FIGS. 5 to 10, in order to perform the workflow of the robot motion illustrated in FIG. 4, the positions where the apparatus for controlling the robot should be measured or taught, that is, the number of teaching points can be summarized as Table 1 below.

TABLE 1

| Work information | Required work environment information | The number of teaching points |
|---|---|---|
| Picking of material | Position of loading work tray | 3 |
| | Vertical direction of loading work tray | |
| | $i^{th}$ material position | n |
| Opening/closing of machine tool door | Handle start position | 1 |
| | Handle end position | 1 |
| Loading to machine tool | Air blowing position | 1 |
| | Vertical direction of chuck | 4 |
| | Material mounted position | 1 |
| Removal of material workpiece | Air blowing position | 1 |
| | Vertical direction of chuck | 0 |
| | Removal position of workpiece | 1 |
| External air blowing | Air blowing position | 1 |
| Measurement | Inspection position | 1 |
| Unloading of material workpiece | Position of unloading work tray | 3 |
| | Vertical direction of unloading work tray | |
| | $i^{th}$ material position | n |
| Initial position | Initial position information | 1 |
| Number of total teaching points | | 19 + 2n |

Referring to Table 1, in order for the robot to perform picking of the material from the work tray for loading the material to the machine tool 510, three teaching points (coordinates) are required to specify the position and the vertical direction of the loading work tray, and also in order to teach the point where the material is placed within the loading work tray, n teaching points are required. And, the teachings for the start point and the end point of the door handle are required to open and close the door of the machine tool 510. However, since when opening and closing the door, the start point becomes the end point and the end point becomes the start point, only two teaching points may be possible. In order to load the picked material to the chuck 520 of the machine tool 510, an air-blowing position for removing dust, four teaching points for indicating the vertical direction of the chuck, and one teaching point indicating the position of the chuck may be required.

And, in order for the machine tool 510 to process the material, to retract the workpiece of the material from the chuck 520 and then to unload it on the unloading work tray, 8+n teaching points including teaching points for the position of the unloading work tray, the vertical direction of the unloading work tray, the position where the workpiece of the material will be placed within the unloading work tray are required. As a result, total 19+2n teaching points are required to process all of materials provided on one loading tray and to place them on the unloading tray.

It takes a considerable effort and time to inform the robot controller 120 of such a large number of teaching points. If the teaching point can be reduced, there can be the advantage to teach the robot motion in an easy and short time.

The present disclosure provides a method of minimizing the work information for controlling the robot as well as the method of controlling the robot based upon information related with the work. A built-in work tray and a built-in gripper can be used to reduce the number of teaching points by the method in accordance with the present disclosure.

The built-in work tray and the built-in gripper mean that the robot controller 120 has built-in information related with the work tray and the gripper. That is, when the robot is sold and produced, it means that the robot controller 120 already has built-in the information on the built-in work tray and the built-in gripper to be delivered to a purchaser.

Figure 11:
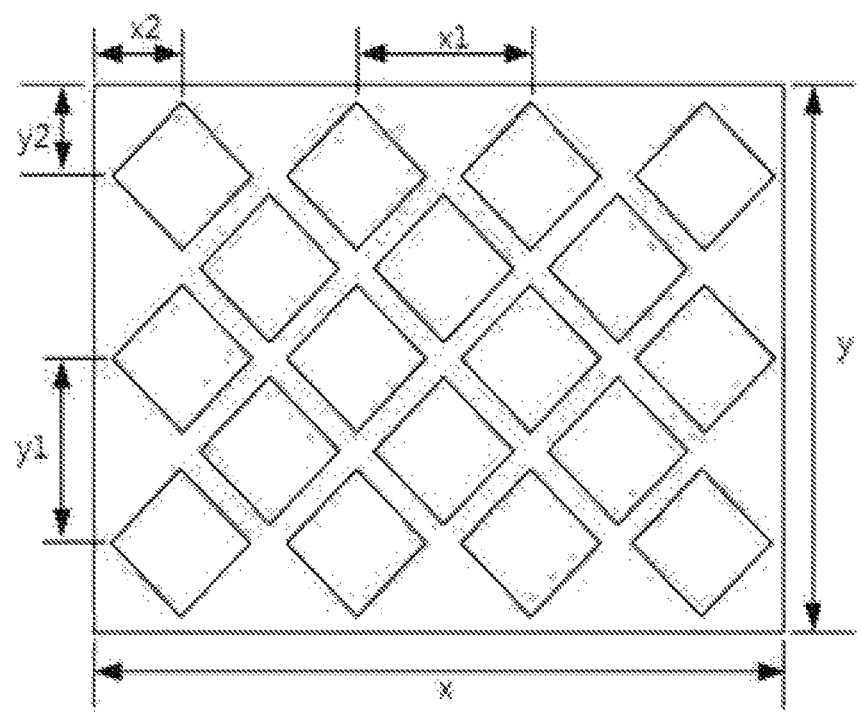
FIG. 11 is a perspective view illustrating a built-in work tray in accordance with one embodiment of the present disclosure.

FIG. 11 is a perspective view illustrating the built-in work tray in accordance with one embodiment of the present disclosure.

Referring to FIG. 11, in the built-in work tray, the magnitudes (x, y) of the work tray, the intervals (x1, y1) between the positions where the material or the workpiece of the material is placed, the relative positions (x2, y2) from the reference point to the position where the original material or the workpiece of the material is placed and the like are determined. The robot has built-in information on the work tray described above from the time of production, and if only the reference point is taught, the robot can automatically set the initial position that will pick up the material, and can also automatically set the position that will pick up next material. That is, it is possible to provide all of the teaching information for picking of the material with only one teaching point. However, for stability of the teaching on the vertical direction of the work tray, it is possible to also teach the reference point and the vertical direction to the work tray using three teaching points including the reference point.

The gripper can perform the function holding the material or the workpiece of the material with one of the end effector attached to the robot. If the distance from the end point of the robot to a device holding the material such as the finger of the gripper can be changed, the teaching should be refreshed every time it changes. Accordingly, even if the shapes can be different, if the distance is kept constant, it is not necessary to perform new teaching every time the gripper is changed. In addition, in order for the material to enter and be loaded in the vertical direction of the chuck 520, the gripper also needs angle information attached to the robot. Without the angle information, many teaching points can be needed to recognize the vertical direction of the chuck. Thus, the number of teaching points can be reduced if the robot controller 120 incorporates and uses the gripper specification, such as a shape, a maximum diameter of the material that the gripper can hold, a finger length, and an attachment angle.

Next, Table 2 is a table illustrating the number of teaching points when using the built-in work tray and the built-in gripper.

TABLE 2

| Work information | Required work environment information | The number of teaching points |
|---|---|---|
| Picking of material | Position of loading work tray | 1(3) |
| | Vertical direction of loading work tray | |
| | $i^{th}$ material position | |
| Opening/closing of machine tool door | Handle start position | 1 |
| | Handle end position | 1 |
| Loading to machine tool | Air blowing position | 1 |
| | Vertical direction of chuck | 1 |
| | Material mounted position | |
| Removal of material workpiece | Air blowing position | 1 |
| | Vertical direction of chuck | 0 |
| | Removal position of workpiece | 1 |
| External air blowing Measurement | Air blowing position | 1 |
| | Inspection position | 1 |
| Unloading of material workpiece | Position of unloading work tray | 1(3) |
| | Vertical direction of unloading work tray | |
| | $i^{th}$ material position | |
| Initial position | Initial position information | 1 |
| Number of total teaching points | | 11(15) |

Comparing Tables 1 and 2, it is possible to reduce a lot of the work environment information necessary for the picking up of the material and the unloading of the workpiece of the material related with the work tray using the built-in work tray, and to reduce the number of teaching points necessary for loading the material to the machine tool using the built-in gripper. As a result, it is possible to largely reduce the number of total teaching points from 19+2n to 11 or 15 using the built-in work tray and the built-in gripper in the example described above.

Figure 12:
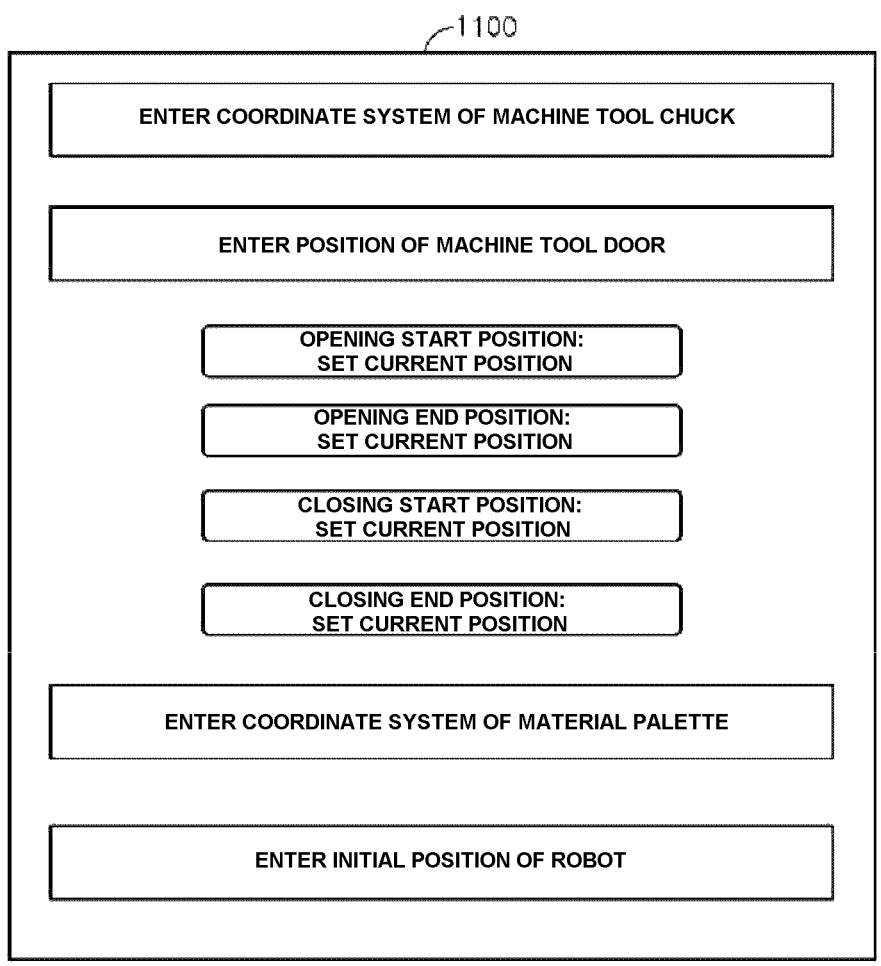
FIG. 12 is a view illustrating a display screen 1100 of a teach pendant 130 when measuring the work environment of the robot in accordance with one embodiment of the present disclosure.

FIG. 12 is a view illustrating a display screen 1100 of the teach pendant 130 when measuring the work environment of the robot in accordance with one embodiment of the present disclosure. Referring to FIG. 12, in order to measure the work environment of the robot, the messages, such as "please enter the coordinate system of the machine tool chuck," "please enter the position of the machine tool door," "please enter the coordinate system of the material palette," and "please enter the initial position of the robot," can be outputted on the display screen 1100 of the teach pendant 130. In one embodiment, if the message of "please enter the coordinate system of the machine tool chuck," is selected, the teach pendant 130 can communicate with the robot controller 120 for the robot controller 120 to measure the information on the coordinate system of the chuck 520 of the machine tool 510.

In one embodiment, if the message of "please enter the position of the machine tool door," is selected, the teach pendant 130 can communicate with the robot controller 120 for the robot controller 120 to measure the information on the start position of the opening of the door 600 of the machine tool 510, the end position of the opening, the start position of the closing, the end position of the closing, and the like. For example, if the message of "please enter the position of the machine tool door" is selected and the icon of "Opening start position: Set current position" is selected, the teach pendant 130 can communicate with the robot controller 120 for the robot controller 120 to measure the information on the start position of the opening of the door of the machine tool 510. Similarly, if the message of "please enter the position of the machine tool door" is selected and the icon of "Opening end position: Set current position," "Closing start position: Set current position" or "Closing end position: Set current position" is selected, the teach pendant 130 can communicate with the robot controller 120 for the robot controller 120 to measure the information on the end position of the opening of the door of the machine tool 510, the start position of the closing, or the end position of the closing.

In one embodiment, if the message of "please enter the coordinate system of the material palette" is selected, the teach pendant 130 can communicate with the robot controller 120 for the robot controller 120 to measure the information on the coordinate system of the work tray 700. In one embodiment, if the message of "please enter the initial position of the robot" is selected, the teach pendant 130 can communicate with the robot controller 120 for the robot controller 120 to measure the information on the initial position of the robot arm 110.

Figure 13:
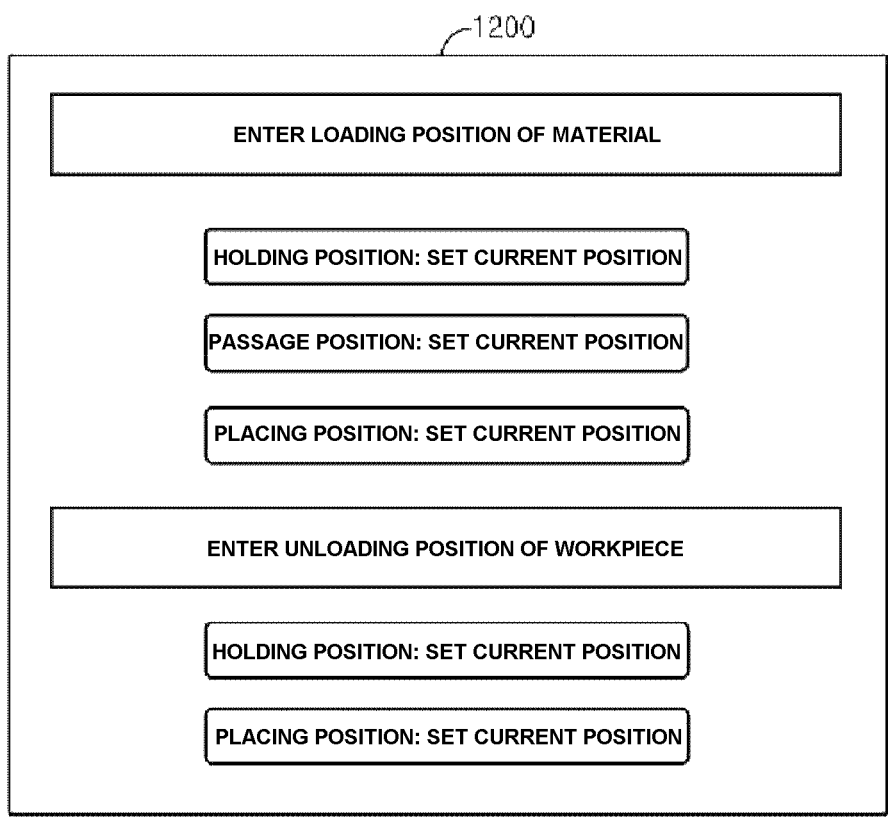
FIG. 13 is a view illustrating a display screen 1200 of the teach pendant 130 when receiving the work information on the robot motion in accordance with one embodiment of the present disclosure.

FIG. 13 is a view illustrating a display screen 1200 of the teach pendant 130 when receiving the work information on the robot motion in accordance with one embodiment of the present disclosure. Referring to FIG. 13, in order to receive the work information on the robot motion, the messages of "please enter the loading position of the material," "please enter the unloading position of the workpiece," and the like can be outputted on the display screen 1200 of the teach pendant 130.

In one embodiment, if the message of "please enter the loading position of the material" is selected, the teach pendant 130 can communicate with the robot controller 120 for the robot controller 120 to receive the position information picking up the material on the work tray 700 or the position information that the material is loaded to the chuck 520 of the machine tool 510. For example, if the message of "please enter the loading position of the material" is selected and the icon of "Holding position: Set current position" is selected, the teach pendant 130 can communicate with the robot controller 120 for the robot controller 120 to measure the position information picking up the material on the work tray 700. Similarly, if the message of "please enter the loading position of the material" is selected and the icon of "Passage position: Set current position" or "Placing position: Set current position" is selected, the teach pendant 130 can communicate with the robot controller 120 for the robot controller 120 to measure the passage position of the robot arm 110 picking up the material or the position information that the material is loaded to the chuck 520 of the machine tool 510.

In one embodiment, if the message of "please enter the unloading position of the workpiece" is selected, the teach pendant 130 can communicate with the robot controller 120 for the robot controller 120 to receive the position information picking up the workpiece from the chuck 520 of the machine tool 510 or the position information placing the workpiece on the work tray 700. For example, if the message of "please enter the unloading position of the workpiece" is selected and the icon of "Holding position: Set current position" is selected, the teach pendant 130 can communicate with the robot controller 120 for the robot controller 120 to measure the position information picking up the workpiece from the chuck 520 of the machine tool 510. Similarly, if the message of "please enter the unloading position of the workpiece" is selected and the icon of "Placing position: Set current position" is selected, the teach pendant 130 can communicate with the robot controller 120 for the robot controller 120 to measure the position information placing the workpiece on the work tray 700.

As described above, the method of entering the work environment information of the robot using the teach pendant 130 was described, but the robot motion can be controlled using the teach pendant 130 having a touch screen. In this case, the robot can be displayed on the teach pendant 130 in two or three dimensions, and the robot motion can be taught or controlled using the screen touch.

As one example, a jog function user interface can be defined. The jog function is composed of a joint jog function and a task jog function, and the task jog function can be again divided into the command for Global coordinates and the command for local coordinates. Furthermore, the teach pendant 130 for the robot or a person's position can be converted into an azimuth angle and used to actively change a viewing angle for an actual simulator. It is possible to adjust which part of the robot is viewed by adjusting the viewing angle. That is, by adjusting the viewing angle, it can be displayed on the screen of the teach pendant 130 as if looking at the side of the robot or viewed from the front.

As one implementation example of the robot control using the joint jog function, for example, the joint or the link to be moved of the robot can be firstly displayed on the screen of the teach pendant 130 by touching/dragging an empty space on the screen of the teach pendant 130 to adjust the viewing angle. And, the joint or the link to be moved on the screen of the teach pendant 130 can be directly selected. The teach pendant 130 can display the selected joint or the link in an active state, which can display colors differently from other parts of the robot. Next, the joint or the link that is selected in response to the action direction arrow popped up when selecting the joint or the link can be dragged in the direction to be moved. That is, the direction in which the joint moves is determined by the direction of the vector that connects the start point and the end point of the drag (hereinafter, referred to as the drag vector). A command can be generated in proportion to the size of the drag vector from the jog speed 0 to the jog top speed that is set by a slide. The jog top speed can be set using a slide bar. When the joint or the link is selected, the arrow indicating the rotation can be popped up at the corresponding joint position to also generate the jog command through the arrow. The default view button can be also activated to display the robot on the screen of the teach pendant 130 in the form of viewing the robot in the teach pendant 130 or in a person's orientation.

As one implementation example of the robot control using the task jog function, for example, there can be a task jog function for linear movement and a task jog function for rotation movement using a projection screen, and a task jog function for linear movement and a task jog function for rotation movement using an isometric screen.

In the task jog function for the linear movement using the projection screen, the basic screen configuration of the teach pendant 130 can be divided into a xy plane, an yz plane, a zx plane, and an isometric view with respect to the robot. If necessary, the screen can be displayed in the form of viewing the robot in a user's orientation using the default view button in the isometric view. The views of the xy plane, the yz plane, and the zx plane of the robot can be selected using the global/local toggle buttons, and the global/local buttons can be mutually, exclusively activated. The drag motion on each plane can generate the jog command in the activated coordinate system (global/local). The size of the jog command is generated in proportion to the size (the length of the line segment from the start point to the end point) of the drag vector, and cannot exceed the maximum jog speed that is set. It can be performed by being converted into the corresponding jog command through the horizontal/ vertical axes components of the drag vector, and the maximum jog speed that is set can be reset using the slide bar as in the joint jog. The command on a specific plane generates only the jog command on the corresponding plane. For example, the drag vector on the xy plane cannot generate a z-direction command, and likewise, the jog motions on the yz and zx planes cannot generate non-zero commands in the x and y directions, respectively. By placing dead-zones on the edges of the horizontal/vertical axes of the xy plane, the yz plane and the zx plane, the drag on the dead-zone of the horizontal axis cannot generate the vertical axis command and the drag on the dead-zone of the vertical axis cannot generate a horizontal axis command.

The task jog function for the rotation movement using the projection screen can be selected by toggling the desired coordinate system (global/local), and the generation of the jog command is the same as the task jog for the linear movement using the projection screen described above, but the conversion of the jog command can be made by making the line segment perpendicular to the jog vector to be the rotation axis and the direction of rotation to match with the direction of the drag vector. An angular velocity of rotation is proportional to the size of the drag vector, and cannot exceed the predetermined jog top speed. The jog top speed can be reset by the slide bar.

In the task jog function for the linear movement using the isometric screen, if necessary, the screen can be also displayed in the form of viewing the robot in the teach pendant 130 or in a person's orientation using the default view button. If the isometric view screen is selected, the corresponding coordinate system can be displayed on the end of the teach pendant in accordance with the selection of the global/local coordinate system. The jog command is performed by dragging from the center of the coordinate system to the unit vector direction of each coordinate system to generate a drag vector. The size of the jog is proportional to the size of the drag vector, and cannot exceed the jog top speed predetermined by the slide bar as before.

If the task jog function for the rotation movement using the isometric screen selects the isometric screen in the state that the rotation has been toggled, the axis and the action arrow of the toggled coordinate system can be popped up. Then, it is possible to firstly select the desired axis of the rotation movement. Other than the selected axis and the corresponding action arrows, the color can be different to indicate that has not been selected. The jog command can be generated by dragging along the action arrow for the selected rotation axis. The jog speed is generated in proportion to the distance moving along the drag vector or the action arrow, and cannot exceed the jog top speed predetermined by the slide bar.

As described above, when using the teach pendant 130 having a touch screen, the teaching and the control of the robot can be easily performed.

Figure 14:
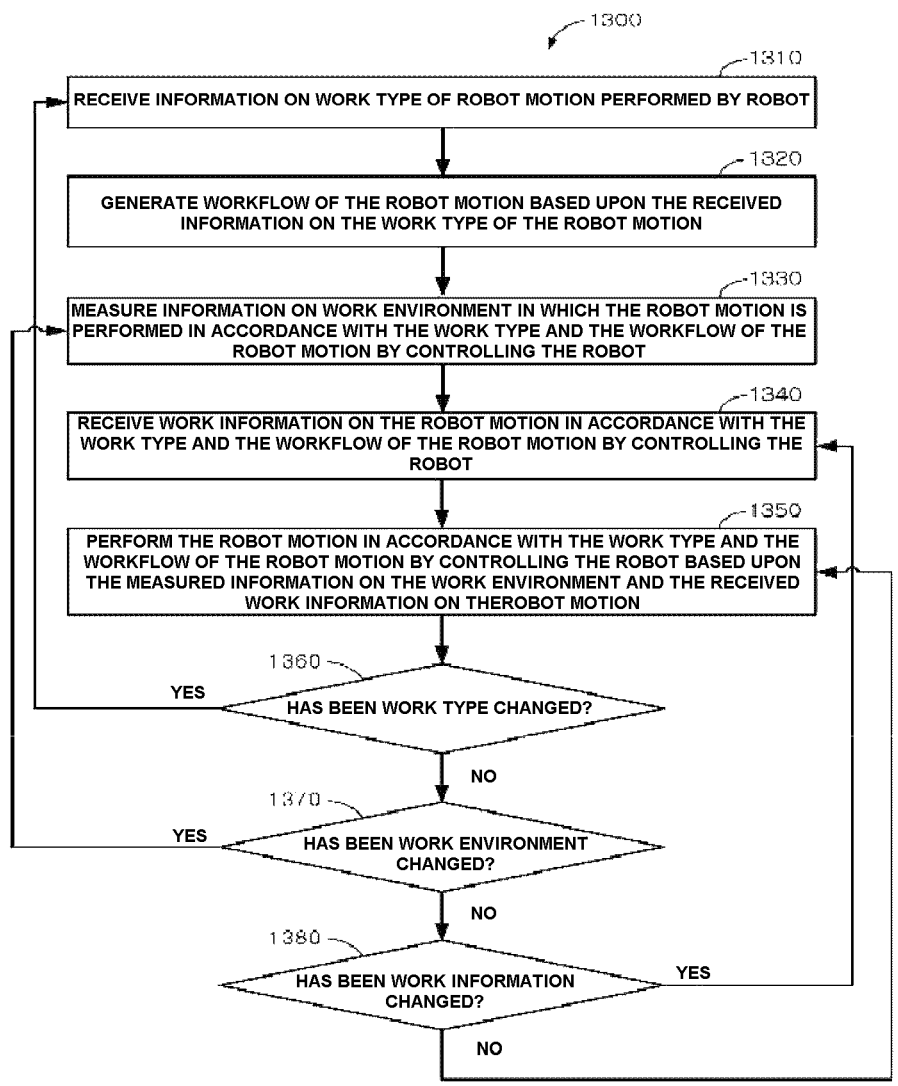
FIG. 14 is a flowchart illustrating the method of controlling the robot 1300 in accordance with one embodiment of the present disclosure.
Figure 15:
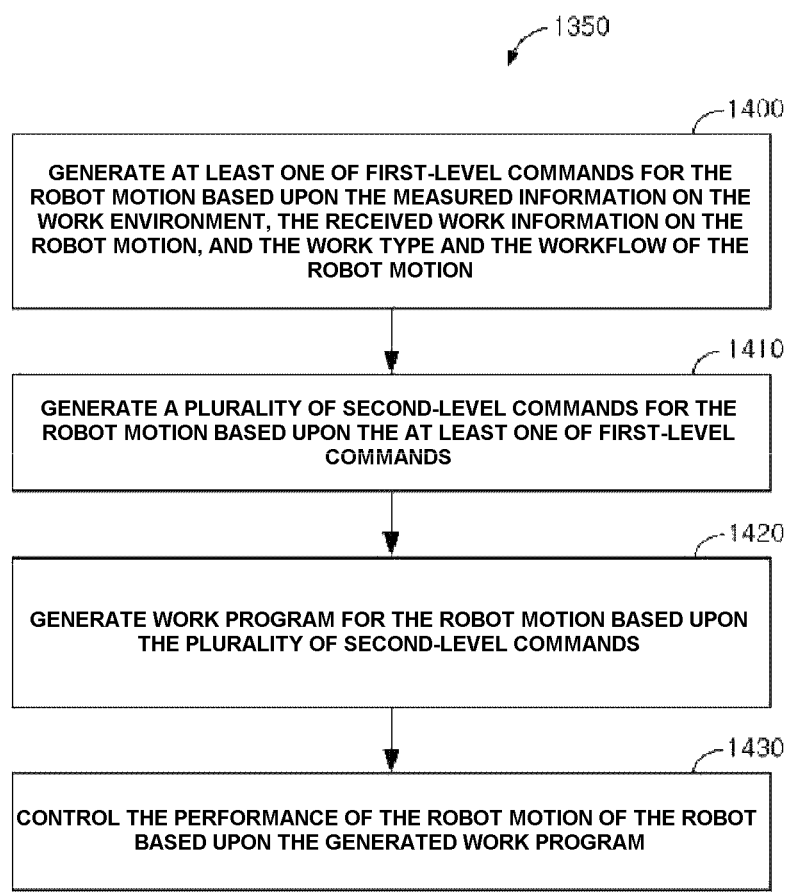
FIG. 15 is a flowchart illustrating a method of controlling performance of the robot motion based upon a work program for controlling the robot 1350 in accordance with one embodiment of the present disclosure.

FIG. 14 is a flowchart illustrating the method of controlling the robot 1300 in accordance with one embodiment of the present disclosure. Hereinafter, it should be noted that the steps illustrated in the flowcharts in FIGS. 14 and 15 are exemplary, each step can be combined, separated, and omitted, and the sequence of each step can be changed. Firstly, the apparatus for controlling the robot can receive the information on the work type of the robot motion performed by the robot (Step 1310). In one embodiment, the apparatus for controlling the robot can include the robot controller 120 and/or the teach pendant 130 illustrated in FIG. 1.

The apparatus for controlling the robot can generate the workflow of the robot motion based upon the received information on the work type of the robot motion (Step 1320). In this case, the apparatus for controlling the robot (e.g., the workflow generation unit 340 in FIG. 3) can generate the workflow composed of different operations in accordance with the received work type of the robot motion. For example, if the received work type is the machine tool auxiliary work, the apparatus for controlling the robot can generate the workflow that is composed of a) placing at an initial position, b) opening the door of the machine tool room, c) picking up the material from the work tray (e.g., the palette), d) entering the machine tool room through the door of the machine tool room, e) placing the picked-up material at a specific position of the machine tool within the machine tool room, and f) waiting for the material to be processed by the machine tool to retract the material. Meanwhile, it is exemplary, and in addition, the apparatus for controlling the robot can generate different workflows that are composed of the operations suitable for the corresponding work in accordance with the received work type, such as injection machine auxiliary work, press auxiliary work, screw assembly work, welding work, bonding work, and vision inspection work.

And, the apparatus for controlling the robot can measure the information on the work environment in which the robot motion is performed in accordance with the work type and the workflow of the robot motion by controlling the robot (Step 1330). In this case, the apparatus for controlling the robot (e.g., the work environment measurement unit 300 in FIG. 3) can measure the information on the work environment in the form of receiving a specific point where the work robot (e.g., the robot arm 110 in FIG. 2) will be placed in the specific operation constituting the workflow. For example, when measuring the work environment information on the position of the work tray (e.g., the palette) where the material to be picked up is placed, the apparatus for controlling the robot can measure the work environment information indicating the position of the work tray picking up the material by placing the robot arm 110 at a specific point on the work tray and storing spatial coordinates at the corresponding position.

Or, when measuring the work environment information on the destination where the robot arm 110 will be moved, the apparatus for controlling the robot may measure the work environment information on the destination of the robot arm 110 by placing the robot arm 110 at the destination to move and storing spatial coordinates thereof at that time. Or, when measuring the work environment information on the passage point on the path on which the robot arm 110 will be moved, the apparatus for controlling the robot can measure the work environment information on the passage point when the robot arm 110 moves by placing the robot arm 110 at a target passage point and storing spatial coordinates thereof at that time. In this case, the robot arm 110 can be controlled to pass through the stored passage point.

For example, if the work type is the machine tool auxiliary work, the information on the work environment can be measured in accordance to the workflow described above. To describe in more detail each step of the workflow described above, a) for the placing at the initial position, it can be specified the position where the robot should be at the beginning of the work. The specifying of the initial position can be taught by measuring the spatial coordinates thereof using the method described above, but if the recommended position for each application built in the robot is used, the work environment information on the initial position can be obtained even without teaching. b) For the opening of the door of the machine tool room, the work environment information on the start position and the end position of the door handle should be measured. As described above, this can measure the work environment information by placing the robot arm 110 at the start position and the end position and storing spatial coordinates thereof at that time. c) For the picking up of the material from the work tray (e.g., the palette), the coordinates where the materials are placed should be measured. For this purpose, by teaching only the reference point using the built-in work tray, or by teaching only three points including the reference point in order to measure stable work environment information on the vertical direction of the work tray, the work environment information on the position of the material can be easily measured. d) For the entering of the machine tool room through the door of the machine tool room and e) the placing of the picked-up material on a specific position of the machine tool within the machine tool room, the measurement for the position and the vertical direction of the chuck 520 within the machine tool room is needed. As described above, this can be measured by causing the gripper of the robot arm 110 to move in the vertical direction of the chuck 520 and then storing the spatial coordinates thereof. In addition, the position where the blowing work for removing the impurities in the material can be performed can be added as the passage way. f) In the waiting for the material to be processed by the machine tool to retract the material, it is necessary to measure the positions within the tray where the workpieces of the material will be placed. For this purpose, by teaching only the reference point using the built-in work tray, or by teaching only three points including the reference point in order to measure stable work environment information on the vertical direction of the work tray, the work environment information on the position of the workpiece of the material can be easily measured.

As described above, the measuring of the work environment information in accordance with the workflow can be a laborious and time-consuming work. However, by using the built-in work tray and/or the built-in gripper matching with the specification built in the robot, the time to measure the work environment information can be significantly reduced.

And, the apparatus for controlling the robot (e.g., the work information reception unit 310 in FIG. 3) can receive the work information on the robot motion in accordance with the work type and the workflow of the robot motion by controlling the robot (Step 1340). In this case, the work information on the robot motion can be the information for specifying or indicating the characteristic of the robot motion, such as approaching, retracting, picking, and placing. The work information on the robot motion can be referred to or used for controlling the mode or the mechanism of the robot motion. As one embodiment, if the work information on the robot motion is the approaching, in order to move to the destination quickly and precisely, the robot can be controlled to move from the initial first point to the intermediate second point in the rapid movement mode that the robot can move the fastest, and to move from the second point to the final third point in the precise movement mode that can move precisely.

As another embodiment, if the work information on the robot motion is the retracting, in order to escape the corresponding position safely and quickly, the robot can be controlled to move from the initial first point to the intermediate second point in the precise movement mode to exactly escape without missing the path, and to move from the intermediate second point to the final third point in the rapid movement mode to quickly escape the position. As yet another embodiment, if the work information on the robot motion is the picking, in order to be suitable for picking up a target object at a specific position, the robot can be controlled to approach from the initial first point to the second point where the target object is placed in the approaching mode, to pick up the target object at the corresponding position, and then to escape from the second point to the final third point in the retracting mode. As still yet another embodiment, if the work information on the robot motion is the placing, in order to be suitable for placing a target object at a specific position, the robot can be controlled to approach from the initial first point to the second point where the target object is placed in the approaching mode, to place the picked-up target object at the corresponding position, and then to escape from the second point to the final third point in the retracting mode.

The apparatus for controlling the robot can perform the robot motion in accordance with the work type and the workflow of the robot motion by controlling the robot based upon the measured information on the work environment, the received work information on the robot motion, and the like (Step 1350). In one embodiment, the apparatus for controlling the robot can control the performance of the robot motion by selecting a suitable work program in accordance with the work type and the workflow of the robot motion based upon the measured information on the work environment, the received work information on the robot motion, and the like, and performing the selected work program. In another embodiment, the apparatus for controlling the robot can control the performance of the robot motion by generating the work program for performing the robot motion in accordance with the work type and the workflow of the robot motion based upon the measured information on the work environment, the received work information on the robot motion, and the like, and running the generated work program.

Next, the apparatus for controlling the robot can determine whether the work type of the robot motion has been changed (Step 1360). If it is determined that the work type of the robot motion has been changed, the apparatus for controlling the robot can again receive the information on the work type of the robot motion performed by the robot (Step 1310), and if it is determined that the work type of the robot motion has not been changed, the apparatus for controlling the robot can determine whether the work environment in which the robot motion is performed has been changed (Step 1370). If it is determined that the work environment in which the robot motion is performed has been changed, the apparatus for controlling the robot can again measure the information on the work environment in which the robot motion is performed in accordance with the work type and the workflow of the robot motion by controlling the robot (Step 1330), and if it is determined that the work environment in which the robot motion is performed has not been changed, the apparatus for controlling the robot can determine whether the work information on the robot motion has been changed (Step 1380). If it is determined that the work information on the robot motion has been changed, the apparatus for controlling the robot can again receive the work information on the robot motion in accordance with the work type and the workflow of the robot motion by controlling the robot (Step 1340), and if it is determined that the work information on the robot motion has not been changed, the apparatus for controlling the robot can continuously perform the robot motion in accordance with the work type and the workflow of the robot motion by controlling the robot based upon the measured information on the work environment and the received work information on the robot motion (Step 1350).

Herein, if the work environment is changed to again measure the information on the work environment, the conventional measured results can be again used. If only the size of the material to be processed has been changed or only the position of the tray has been changed while repeating the same work, only the changed part can be corrected and the same part as the existing work can be used without measurement. Since the measurement work to obtain the information on the work environment requires much effort and time, it is possible to reduce the required time and effort by not making measurements for unchanged parts. Furthermore, it is possible to store past measurement results and to use the past measurement results when similar works are performed.

FIG. 15 is a flowchart illustrating the method of controlling the performance of the robot motion based upon the work program for controlling the robot 1350 in accordance with one embodiment of the present disclosure. Firstly, the apparatus for controlling the robot (e.g., the robot motion control unit 350 in FIG. 3) can generate at least one of first-level commands for the robot motion based upon the measured information on the work environment, the received work information on the robot motion, and the work type and the workflow of the robot motion (Step 1400). In one embodiment, the at least one of first-level commands can be a high-level command including at least one of the approaching command, the retracting command, the picking command, or the placing command. For example, the approaching command can be a high-level command for the robot (e.g., the robot arm 110 in FIG. 2) to effectively approach a specific position, the retracting command can be a high-level command for the robot to effectively escape the specific position, the picking command can be a high-level command for the robot to hold a target object at the specific position, and the placing command can be a high-level command for the robot to place the target object at the specific position.

In one embodiment, each of the approaching command, the retracting command, the picking command, and the placing command can be corresponded to the work information of the approaching, the retracting, the picking, and the placing of the robot. For example, if the received work information of the robot motion is related with the approaching, the apparatus for controlling the robot can generate the approaching command in response to the work information. Similarly, if the received work information of the robot motion is related with the retracting, the picking, or the placing, the apparatus for controlling the robot can generate the retracting command, the picking command, or the placing command in response to the work information.

The apparatus for controlling the robot can generate a plurality of second-level commands for the robot motion based upon the at least one of first-level commands (Step 1410). The plurality of second-level commands can be low-level commands including at least two of a control command of the end effector, a control command of the target machine (e.g., the machine tool), a control command of the peripheral device (e.g., the work tray or the conveyor), a rapid movement command (or a high-speed movement command), a precise movement command, a constant-speed movement command, a repeat command, a condition determination command, and a wait command. For example, if the work type of the robot motion is the machine tool auxiliary work, the control command of the end effector can include a gripper open command or a gripper close command that is a gripper control command, and the control command of the machine tool can include a chuck open command or a chuck close command.

In one embodiment, the first-level command can include a combination of at least two of second-level commands. For example, the approaching command that is the first-level command can be composed of a combination of the rapid movement command and the precise movement command that are the second-level commands. Similarly, the retracting command that is the first-level command can be also composed of a combination of the rapid movement command and the precise movement command that are the second-level commands. Furthermore, the picking command that is the first-level command can be composed of a combination of the rapid movement command, the precise movement command, or the gripper control command that are the second-level commands. Similarly, the placing command that is the first-level command can be also composed of a combination of the rapid movement command, the precise movement command, or the gripper control command that are the second-level commands.

The apparatus for controlling the robot can generate a work program for the robot motion based upon the plurality of second-level commands (Step 1420). In one embodiment, the apparatus for controlling the robot can generate a plurality of third-level commands that are lower-level commands based upon the plurality of second-level commands. In this case, the apparatus for controlling the robot can be configured to generate the work program for the robot motion based upon the plurality of third-level commands. The apparatus for controlling the robot can control the performance of the robot motion based upon the generated work program (Step 1430).

Those skilled in the art will recognize that the various illustrative blocks, devices, or operations described in connection with the configurations disclosed herein can be implemented as electronic hardware, computer software, or combination thereof. These blocks, devices, or operations can be implemented or performed as a processor, a digital signal processor (DSP), an application-specific integrated circuit (ASIC) or an application-specific standard product (ASSP), a field-programmable gate array (FPGA) or other programmable logic device, a discrete gate or transistor logic, a discrete hardware component or any combination thereof designed to produce the configurations as disclosed herein. The processor can be implemented as a combination of computing devices, for example, a combination of a DSP and a microprocessor, a plurality of microprocessors, one or more microprocessors in conjunction with a DSP core, or any other configuration. The computer software or program can be stored in a computer readable medium such as a random access memory (RAM), read only memory (ROM), non-volatile RAM such as flash RAM, erasable and programmable ROM (EPROM), electrically erasable and programmable ROM (EEPROM), register, a hard disk, a removable disk, a CD-ROM or any other form of storage medium known in the art, and which may be executed by an array of logical elements, such as a processor or a DSP. An exemplary storage medium can be coupled to the processor, and the processor can read information from, and write information to, the storage medium. As an alternative, the storage medium can be integral with the processor. The processor and the storage medium can be located within the ASIC. The ASIC can be located within the user terminal. As an alternative, the processor and the storage medium can reside as discrete components in a user terminal.

The method and technology disclosed herein can be embodied in, for example, one or more computer readable recording mediums as enumerated herein, as a set of one or more commands executable by a machine comprising an array of logic elements (e.g., a processor, a microprocessor, a microcontroller, or other finite-state machine, etc.). The "computer readable recording medium" can include any medium comprising volatile, non-volatile, removable, or non-removable medium capable of storing or transmitting information. Examples of the computer readable recording medium can include an electronic circuitry, a semiconductor memory device, a ROM, a flash memory, an Erasable ROM (EROM), a floppy diskette or other magnetic storage devices, CD-ROM/DVD or other optical storage devices, a hard disk, an optical fiber medium, a Radio Frequency (RF) link, or any other medium that can be used to store and access the desired information. All or part of one or more sets of the commands executable by the machine can be downloaded via a computer network such as an internet or an intranet.

While the above-described embodiments have been described with reference to various embodiments illustrated in the drawings for understanding the present disclosure, it will be understood that it is not limited thereto, and various modifications and equivalent embodiments can be also made by those skilled in the art. Accordingly, it will be understood to those skilled in the art that various modifications and other equivalent embodiments can be made without departing from the technical spirit and scope of the disclosure as defined in the following claims.

The invention claimed is:

1. A method of controlling a robot, comprising:
receiving information on a work type of robot motion performed by the robot;
generating workflow of the robot motion based upon the received information on the work type of the robot motion;
obtaining information on a work environment in which the robot motion is performed in accordance with the work type and the workflow of the robot motion by controlling the robot;
obtaining work information on the robot motion in accordance with the work type and the workflow of the robot motion by controlling the robot; and
performing the robot motion in accordance with the work type and the workflow of the robot motion by controlling the robot based upon the obtained information on the work environment and the obtained work information on the robot motion,
wherein the obtaining work information on the robot motion in accordance with the work type and the workflow of the robot motion by controlling the robot comprises obtaining the work information generated based upon information of the robot motion when the robot is operated in accordance with the work type and the workflow of the robot motion by a user's direct teaching,
wherein the user's direct teaching includes giving the position or movement of the robot by user's moving the robot directly.

2. The method of controlling the robot of claim 1, wherein the obtaining information on the work environment is performed when the robot is initially installed or when the work environment has been changed.

3. The method of controlling the robot of claim 1, further comprising communicating with a target machine or a peripheral device of the robot motion in connection with a performance of the robot motion.

4. The method of controlling the robot of claim 1, wherein the obtaining information on the work environment comprises obtaining information on the work environment by a contact measurement device of the robot.

5. The method of controlling the robot of claim 1, wherein the obtaining information on the work environment comprises obtaining information on the work environment by a non-contact measurement device of the robot.

6. The method of controlling the robot of claim 1, wherein the obtaining information on the work environment comprises obtaining information on the work environment by a contact measurement device of the robot based upon the information of the robot motion when the robot is operated by a user's direct teaching.

7. The method of controlling the robot of claim 1, wherein performing the robot motion in accordance with the work type and the workflow of the robot motion by controlling the robot based upon the obtained information on the work environment and the obtained work information on the robot motion comprises:

generating a work program for performing the robot motion; and controlling the performance of the robot motion by running the work program.

8. The method of controlling the robot of claim 7, wherein the generating a work program for performing the robot motion comprises:

generating at least one of first-level commands for the robot motion based upon the obtained information on the work environment, the obtained work information on the robot motion, and the work type and the workflow of the robot motion; and generating a plurality of second-level commands for the robot motion based upon the at least one of first-level commands, and wherein each of the at least one of first-level commands comprises a combination of at least two of the plurality of second-level commands.

9. The method of controlling the robot of claim 1, wherein the work type of the robot motion is related with an auxiliary work of a machine tool and wherein the information on the work environment comprises at least one of information on a coordinate system of a chunk of the machine tool, information on a position of a door of the machine tool, information on an initial position of the robot for performing the robot motion, or information on a position of a work tray on which materials processed by the machine tool are placed.

10. The method of controlling the robot of claim 9, wherein the work information on the robot motion comprises at least one of information related with picking up the materials, from the work tray information related with loading the materials to the chuck of the machine tool, information related with unloading workpieces of the materials processed by the machine tool from the chuck of the machine tool, information related with placing the workpieces on the work tray, or information related with performing blowing on the workpieces of the material.

11. The method of controlling the robot of claim 9, wherein the obtaining information on the work environment in which the robot motion is performed or the obtaining work information on the robot motion comprises aligning a direction of the robot with respect to at least one of the work tray, the chuck of the machine tool, or the door of the machine tool.

12. The method of controlling the robot of claim 9, wherein the obtaining information on the work environment comprises obtaining information on positions of the materials to be processed by the machine tool by measuring a reference point and one to three teaching points for information on a vertical direction of the work tray and obtaining information on the work tray, wherein the information on the work tray is determined and built in the robot in advance and the information on the work tray comprises a size, an interval between positions where the materials are placed, and a distance from the reference point to a position where one of the materials is placed closest.

13. The method of controlling the robot of claim 9, wherein the obtaining information on the work environment comprises obtaining information on positions where the workpieces of the materials processed by the machine tool will be unloaded by measuring a reference point and one to three teaching points for information on a vertical direction of the work tray and obtaining information on the work tray, wherein the information on the work tray is determined and built in the robot in advance and the information on the work tray comprises a size, an interval between positions where the materials are placed, and a distance from the reference point to a position where one of the materials is placed closest.

14. An apparatus for controlling a robot; comprising:

a workflow generation unit configured to receive information on a work type of robot motion performed by the robot, and to generate workflow of the robot motion based upon the received information on the work type of the robot motion;

a work environment measurement unit configured to obtain information on a work environment in which the robot motion is performed in accordance with the work type and the workflow of the robot motion by controlling the robot;

a work information reception unit configured to obtain work information on the robot motion in accordance with the work type and the workflow of the robot motion by controlling the robot; and a robot motion control unit configured to perform the robot motion in accordance with the work type and the workflow of the robot motion by controlling the robot based upon the obtained information on the work environment and the obtained work information on the robot motion, wherein the work information reception unit is configured to obtain the work information generated based upon the information of the robot motion when the robot is operated in accordance with the work type and the workflow of the robot motion by a user's direct teaching, wherein the user's direct teaching includes giving the position or movement of the robot by user's moving the robot directly.

15. The apparatus for controlling the robot of claim 14, wherein the work environment measurement unit is configured to control the robot for the information on the work environment to be measured by a contact measurement device of the robot.

16. The apparatus for controlling the robot of claim 15, wherein the work environment measurement unit is configured to obtain the information on the work environment when the robot is operated in accordance with the work type and the workflow of the robot motion by a user's direct teaching.

17. The apparatus for controlling the robot of claim 14, wherein the work environment measurement unit is configured to control the robot for the information on the work environment to be measured by a camera of the robot or a laser beam measuring device.

18. The apparatus for controlling the robot of claim 14, wherein the work environment measurement unit is configured to obtain at least one information of information on a work tray and specification information of a gripper, wherein the information on a work tray comprises a size, an interval between positions where materials are placed, and a distance from a reference point to a position where one of the materials is placed closest are determined, and wherein the specification information of a gripper comprises a maximum diameter of a catchable material, a finger length, and an attachment angle, and wherein the work environment measurement unit is configured to control the robot based upon the at least one information for obtaining the information on the work environment to be measured by the contact measurement device of the robot.

19. The apparatus for controlling the robot of claim 14, further comprising a work program generation unit configured to generate a work program for performing the robot motion based upon the measured information on the work environment, the received work information on the robot motion, and the work type and the workflow of the robot motion, and wherein the robot motion control unit is configured to control a performance of the robot motion of the robot based upon the generated work program.

20. The apparatus for controlling the robot of claim 14, further comprising a communication interface unit configured to communicate with a target machine or a peripheral device in connection with a performance of the robot motion.

\* \* \* \* \*